United States Patent
Zhou et al.

(10) Patent No.: US 12,495,316 B2
(45) Date of Patent: Dec. 9, 2025

(54) UTILIZATION OF SECONDARY LINK FOR BEAM FAILURE WARNING AND RECOVERY

(71) Applicant: QUALCOMM Incorporated, San Diego, CA (US)

(72) Inventors: Shanyu Zhou, San Diego, CA (US); Jelena Damnjanovic, Del Mar, CA (US); Junyi Li, Fairless Hills, PA (US); Yan Zhou, San Diego, CA (US); Qing Li, Princeton Junction, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 17/730,072

(22) Filed: Apr. 26, 2022

(65) Prior Publication Data

US 2023/0345269 A1 Oct. 26, 2023

(51) Int. Cl.
*H04W 24/04* (2009.01)
*H04B 7/06* (2006.01)
(Continued)

(52) U.S. Cl.
CPC ........ *H04W 24/04* (2013.01); *H04B 7/06964* (2023.05); *H04W 72/21* (2023.01); *H04W 76/18* (2018.02)

(58) Field of Classification Search
CPC ..... H04W 24/04; H04W 76/18; H04W 72/21; H04B 7/06964
See application file for complete search history.

(56) References Cited

U.S. PATENT DOCUMENTS

2019/0254064 A1* 8/2019 Islam ................... H04W 74/04
2019/0289588 A1* 9/2019 Akkarakaran ........ H04L 5/0025
(Continued)

FOREIGN PATENT DOCUMENTS

EP 3681229 A1 * 7/2020 ........... H04B 7/0413
WO WO-2020166994 A1 * 8/2020 ............ H04W 24/04

OTHER PUBLICATIONS

3GPP Specifications TS 38.321 V16.4.0; Section 5.4.5, Section 6.1.3.1, Section 6.1.3.35 (Year: 2021).*
(Continued)

*Primary Examiner* — Kashif Siddiqui
(74) *Attorney, Agent, or Firm* — Guang Y. Zhang; Holland & Hart LLP

(57) ABSTRACT

Methods, systems, and devices for wireless communications are described. A first user equipment (UE) may receive a control signal that indicates one or more parameters for a beam failure reporting procedure. The beam failure reporting procedure may be associated with a multi-path wireless connection for the first UE, which may include a first link between the first UE and a network entity and a second link between the first UE and a second UE. The first UE may monitor, as part of a multi-path beam failure recovery procedure, the first link for one or more signals associated with beam failure detection based on receiving the control signal. The first UE may transmit, via the first link or the second link, one or more messages in accordance with the beam failure reporting procedure based on monitoring. The one or more messages may include information associated with the one or more parameters.

26 Claims, 19 Drawing Sheets

(51) Int. Cl.
*H04W 72/21* (2023.01)
*H04W 76/18* (2018.01)

(56) References Cited

U.S. PATENT DOCUMENTS

| | | | |
|---|---|---|---|
| 2020/0029384 A1* | 1/2020 | Hong | H04W 36/305 |
| 2020/0220609 A1* | 7/2020 | Venugopal | H04W 48/20 |
| 2020/0229006 A1* | 7/2020 | Chen | H04B 7/06954 |
| 2020/0267797 A1* | 8/2020 | Wei | H04W 72/21 |
| 2020/0280360 A1* | 9/2020 | Bai | H04W 72/046 |
| 2020/0413393 A1* | 12/2020 | Luo | H04W 24/04 |
| 2021/0058129 A1* | 2/2021 | Takeda | H04B 7/088 |
| 2021/0218457 A1* | 7/2021 | Xu | H04B 7/0695 |
| 2021/0321315 A1* | 10/2021 | Yi | H04W 76/18 |
| 2022/0038164 A1* | 2/2022 | Wei | H04L 5/0051 |
| 2023/0262500 A1* | 8/2023 | Zhou | H04W 24/10 |
| | | | 370/242 |
| 2023/0412234 A1* | 12/2023 | Zhou | H04W 76/19 |
| 2023/0421230 A1* | 12/2023 | Zhang | H04W 72/02 |

OTHER PUBLICATIONS

3GPP Specifications TS 38.331 V15.13.0; Section 6.2.2, Section 6.3.2 (Year: 2021).*

* cited by examiner

UTILIZATION OF SECONDARY LINK FOR BEAM FAILURE WARNING AND RECOVERY

FIELD OF TECHNOLOGY

The following relates to wireless communications, including utilization of secondary link for beam failure warning and recovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support utilization of a secondary link for beam failure warning and recovery in a multi-path communications scheme. In the multi-path communications scheme, a first UE may communicate with a network entity via a first communication path (e.g., a direct link) and with a second UE via a second communication path (e.g., a secondary link). For example, the described techniques provide for reducing the use of a random access channel (RACH) for instances of beam failure recovery (BFR) by utilizing a secondary link or path of the multi-path communication scheme. In some aspects, a network entity may configure a first user equipment (UE) via control signaling with one or more parameters indicating signaling content to include in a beam failure detection (BFD) message or a beam failure warning message in accordance with a beam failure reporting procedure.

According to some techniques, the first UE may operate in accordance with an unconditional beam failure reporting procedure where the first UE may transmit beam failure related information associated with the one or more parameters via both a direct link and the secondary link concurrently. In some examples, the first UE may operate in accordance with a conditional beam failure reporting procedure where the first UE may initially transmit beam failure related information via either the direct link or the secondary link, start a timer, and if the timer expires before the first UE receives a response, the first UE may transmit beam failure related information via the other link. In some cases, the first UE may perform respective BFR procedures via RACH on the direct link and via a medium access control-control element (MAC-CE) message on the secondary link. In some examples, the network entity may cancel the BFR procedure on the direct link or the secondary link based on the order in which the network receives indication of BFR from each respective link (e.g., via an implicit cancelation or explicit cancelation).

A method is described. The method may include receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE, monitoring, as part of a multi-path BFR procedure, the first link for one or more signals associated with BFD based on the control signal, and transmitting, via the first link or the second link, one or more messages in accordance with the beam failure reporting procedure, the one or more messages including information associated with the one or more parameters based on monitoring.

An apparatus is described. The apparatus may include a processor, memory coupled with the processor, and instructions stored in the memory. The instructions may be executable by the processor to cause the apparatus to receive a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE, monitor, as part of a multi-path BFR procedure, the first link for one or more signals associated with BFD based on the control signal, and transmit, via the first link or the second link, one or more messages in accordance with the beam failure reporting procedure, the one or more messages including information associated with the one or more parameters based on monitoring.

Another apparatus is described. The apparatus may include means for receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE, means for monitoring, as part of a multi-path BFR procedure, the first link for one or more signals associated with BFD based on the control signal, and means for transmitting, via the first link or the second link, one or more messages in accordance with the beam failure reporting procedure, the one or more messages including information associated with the one or more parameters based on monitoring.

A non-transitory computer-readable medium storing code is described. The code may include instructions executable by a processor to receive a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE, monitor, as part of a multi-path BFR procedure, the first link for one or more signals associated with BFD based on the control signal, and transmit, via the first link or the second link, one or more messages in accordance with the beam failure reporting procedure, the one or more messages including information associated with the one or more parameters based on monitoring.

In some examples of the method, apparatuses, and non-transitory computer-readable medium described herein, transmitting the one or more messages may include operations, features, means, or instructions for transmitting a first message of the one or messages via the first link, the first message including at least a first portion of the information associated with the one or more parameters, where the first message may be of a first message type including one of a layer 1 (L1) type or a layer 2 (L2) type.

In some examples of the method, apparatuses, and non-transitory computer-readable medium described herein, transmitting the one or more messages may include operations, features, means, or instructions for transmitting a second message of the one or messages via the second link, the second message including at least a second portion of the information associated with the one or more parameters, where the second message may be of a second message type including one of the L1 type or the L2 type.

In some examples of the method, apparatuses, and non-transitory computer-readable medium described herein, concurrently transmitting the first message and the second message based on the beam failure reporting procedure being an unconditional beam failure reporting procedure.

In some examples of the method, apparatuses, and non-transitory computer-readable medium described herein, the concurrently transmitting the first message and the second message may include operations, features, means, or instructions for transmitting the first message that includes a first MAC-CE indicating the first portion of the information and transmitting the second message that includes a second MAC-CE indicating the second portion of the information, where the first portion of the information and the second portion of the information may be a same information or different information based on the one or more parameters indicated in the control signal.

In some examples of the method, apparatuses, and non-transitory computer-readable medium described herein, the concurrently transmitting the first message and the second message may include operations, features, means, or instructions for transmitting the first message that includes a MAC-CE indicating the first portion of the information and transmitting the second message that includes uplink control information (UCI) indicating the second portion of the information, where the first portion of the information includes a first contents greater than the second portion of the information including a second contents based on the one or more parameters indicated in the control signal.

In some examples of the method, apparatuses, and non-transitory computer-readable medium described herein, the concurrently transmitting the first message and the second message may include operations, features, means, or instructions for transmitting the first message that includes UCI indicating the first portion of the information and transmitting the second message that includes a MAC-CE indicating the second portion of the information.

In some examples of the method, apparatuses, and non-transitory computer-readable medium described herein, the concurrently transmitting the first message and the second message may include operations, features, means, or instructions for transmitting the first message that includes a first UCI indicating the first portion of the information and transmitting the second message that includes a second UCI indicating the second portion of the information, where the first portion of the information and the second portion of the information includes a same contents or a different contents based on the one or more parameters indicated in the control signal.

In some examples of the method, apparatuses, and non-transitory computer-readable medium described herein, transmitting the one or more messages may include operations, features, means, or instructions for transmitting the first message via the first link, initiating a timer after transmitting the first message based on the beam failure reporting procedure being a conditional beam failure reporting procedure, and transmitting, via the second link, the second message upon expiration of the timer.

Some examples of the method, apparatuses, and non-transitory computer-readable medium described herein may further include operations, features, means, or instructions for receiving an indication of a timer duration for the timer via a MAC-CE, via downlink control information (DCI), or via a radio resource control (RRC) signal.

In some examples of the method, apparatuses, and non-transitory computer-readable medium described herein, transmitting the one or more messages may include operations, features, means, or instructions for transmitting the second message via the second link, initiating a timer after transmitting the second message based on the beam failure reporting procedure being a conditional beam failure reporting procedure, and transmitting, via the first link, the first message upon expiration of the timer.

Some examples of the method, apparatuses, and non-transitory computer-readable medium described herein may further include operations, features, means, or instructions for receiving an indication of a timer duration for the timer via a MAC-CE, via DCI, or via a RRC signal.

In some examples of the method, apparatuses, and non-transitory computer-readable medium described herein, the first portion of the information associated with the one or more parameters may be based on the first message type, and the second portion of the information associated with the one or more parameters may be based on the second message type.

In some examples of the method, apparatuses, and non-transitory computer-readable medium described herein, transmitting the one or more messages may include operations, features, means, or instructions for transmitting, via the first link, a random access message as part of a random access procedure based on a beam failure of a first beam of the first link, where the beam failure may be detected based on the one or more parameters indicated by the control signal and transmitting, via the second link, a MAC signal as part of a BFR procedure for the first beam of the first link, where the random access message and the MAC signal may be transmitted concurrently.

Some examples of the method, apparatuses, and non-transitory computer-readable medium described herein may further include operations, features, means, or instructions for receiving a cancellation message that cancels the random access procedure after transmitting the random access message and receiving an indication of a second beam for use by the first UE for the first link based on cancellation of the random access procedure.

Some examples of the method, apparatuses, and non-transitory computer-readable medium described herein may further include operations, features, means, or instructions for receiving a signal indicating success of the random access procedure after transmitting the MAC signal.

Some examples of the method, apparatuses, and non-transitory computer-readable medium described herein may further include operations, features, means, or instructions for receiving a cancellation message that cancels the BFR procedure based on the success of the random access procedure.

In some examples of the method, apparatuses, and non-transitory computer-readable medium described herein, the random access procedure or the BFR procedure may be performed based on a quality of service for serving traffic being above a configured threshold or link qualities associated with the first link or the second link.

In some examples of the method, apparatuses, and non-transitory computer-readable medium described herein, transmitting the one or more messages may include operations, features, means, or instructions for transmitting, via the second link, a MAC signal as part of a BFR procedure for a first beam of the first link and receiving a beam switch command indicating a switch from the first beam of the first link to a second beam of the first link based on transmitting the MAC signal.

In some examples of the method, apparatuses, and non-transitory computer-readable medium described herein, the MAC signal may be transmitted based on the second link having a greater link quality than the first link.

In some examples of the method, apparatuses, and non-transitory computer-readable medium described herein, the information associated with the one or more parameters includes a beam failure flag indicating a beam failure or a potential beam failure of a first beam of the first link.

In some examples of the method, apparatuses, and non-transitory computer-readable medium described herein, the information of the one or more messages includes information associated with a beam failure warning, the information associated with the beam failure warning includes a predicted beam blocking of the first beam, a channel strength associated with the first beam satisfying a threshold, or both.

In some examples of the method, apparatuses, and non-transitory computer-readable medium described herein, the information associated with the one or more parameters includes a BFD status, the BFD status includes a beam failure indication count, a beam failure indication history for a configured duration, or both.

In some examples of the method, apparatuses, and non-transitory computer-readable medium described herein, the information associated with the one or more parameters includes beam failure triggering conditions, the beam failure triggering conditions including a predicted beam failure, a consecutive number of recorded beam failure indications satisfying a first threshold, a channel strength measurement satisfying a second threshold, or a combination thereof.

In some examples of the method, apparatuses, and non-transitory computer-readable medium described herein, the information associated with the one or more parameters includes a requested response from the network entity, the requested response includes a beam switch indication, an adjustment for a pattern, location, or frequency of a BFD reference signal, or a combination thereof.

In some examples of the method, apparatuses, and non-transitory computer-readable medium described herein, the information associated with the one or more parameters includes one or more beam preferences associated with the first UE.

In some examples of the method, apparatuses, and non-transitory computer-readable medium described herein, receiving the control signal may include operations, features, means, or instructions for receiving, in the control signal, an indication of the one or more parameters for the beam failure reporting procedure based on a latency associated with the one or more messages, a size of the one or more messages, an uplink resource availability, a quality of service parameter, or a combination thereof.

Some examples of the method, apparatuses, and non-transitory computer-readable medium described herein may further include operations, features, means, or instructions for receiving, via a MAC-CE or via DCI, a signal that activates or deactivates the beam failure reporting procedure for the first UE.

Some examples of the method, apparatuses, and non-transitory computer-readable medium described herein may further include operations, features, means, or instructions for transmitting, via a MAC-CE or via UCI, a signal that activates or deactivates the beam failure reporting procedure for the first UE.

A method is described. The method may include transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE and receiving, via the first link or the second link, one or more messages in accordance with the beam failure reporting procedure, the one or more messages including information associated with the one or more parameters based on monitoring.

An apparatus is described. The apparatus may include a processor, memory coupled with the processor, and instructions stored in the memory. The instructions may be executable by the processor to cause the apparatus to transmit a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE and receive, via the first link or the second link, one or more messages in accordance with the beam failure reporting procedure, the one or more messages including information associated with the one or more parameters based on monitoring.

Another apparatus is described. The apparatus may include means for transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE and means for receiving, via the first link or the second link, one or more messages in accordance with the beam failure reporting procedure, the one or more messages including information associated with the one or more parameters based on monitoring.

A non-transitory computer-readable medium storing code is described. The code may include instructions executable by a processor to transmit a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE and receive, via the first link or the second link, one or more messages in accordance with the beam failure reporting procedure, the one or more messages including information associated with the one or more parameters based on monitoring.

In some examples of the method, apparatuses, and non-transitory computer-readable medium described herein, receiving the one or more messages may include operations, features, means, or instructions for receiving a first message of the one or messages via the first link, the first message including at least a first portion of the information associated with the one or more parameters, where the first message may be of a first message type including one of a L1 type or a L2 type.

In some examples of the method, apparatuses, and non-transitory computer-readable medium described herein, receiving the one or more messages may include operations, features, means, or instructions for receiving a second message of the one or messages via the second link, the second message including at least a second portion of the information associated with the one or more parameters, where the second message may be of a second message type including one of the L1 type or the L2 type.

In some examples of the method, apparatuses, and non-transitory computer-readable medium described herein, concurrently receiving the first message and the second message based on the beam failure reporting procedure being an unconditional beam failure reporting procedure.

DETAILED DESCRIPTION

Figure 1:
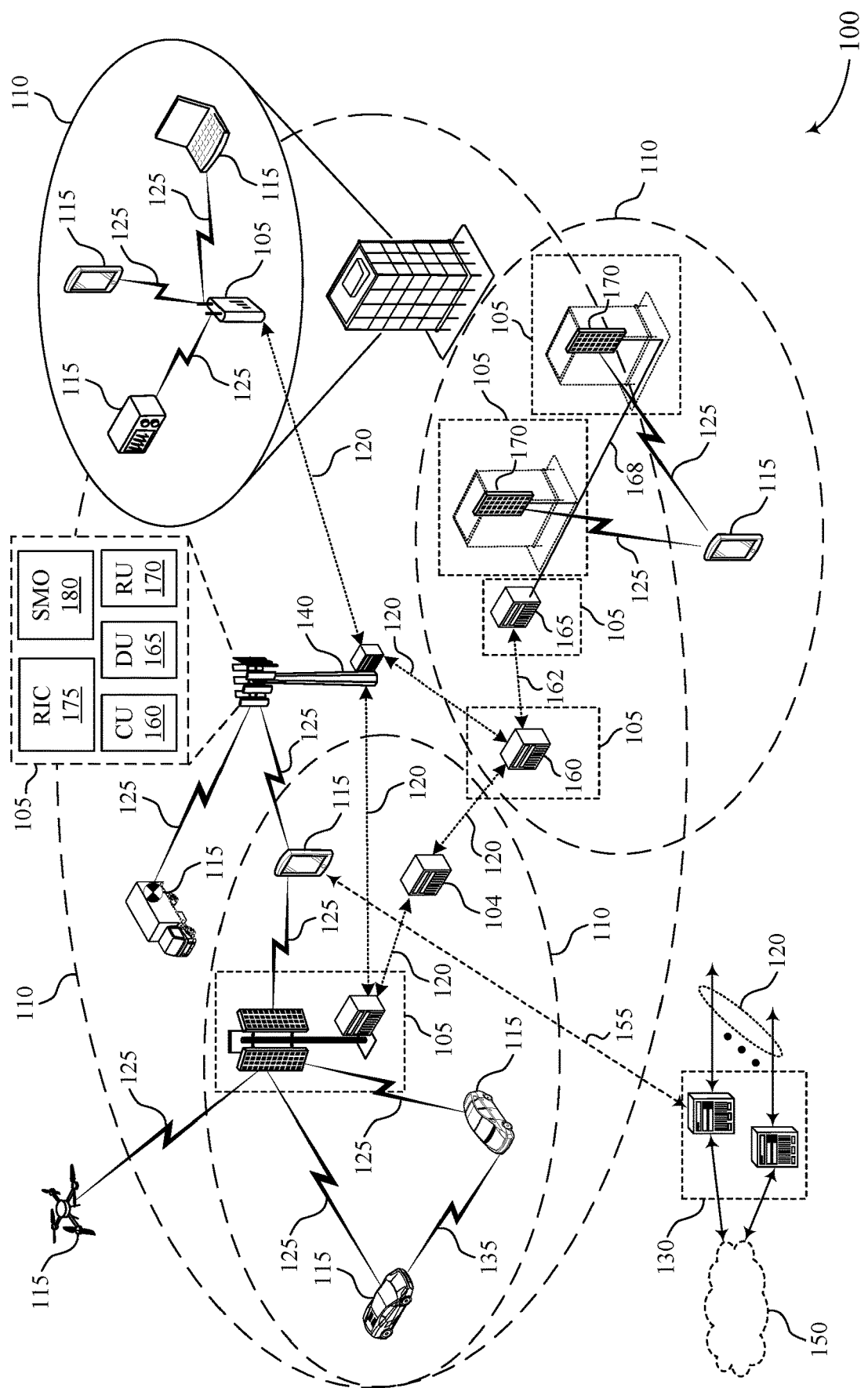
FIG. 1 illustrates an example of a wireless communications system that supports utilization of secondary link for beam failure warning and recovery in accordance with one or more aspects of the present disclosure.

In some examples of wireless communications, a wireless device (e.g., a user equipment (UE)) may communicate with a network entity in accordance with a multi-path communication scheme (e.g., two or more communication paths or links that are associated with or support communications for the same cell). For example, a first UE may communicate with a network entity via a direct Uu link and communicate with the network entity via a second UE (e.g., a relay UE) via a secondary link (e.g., a sidelink between the first and second UE and a Uu link between the second UE and the network entity). In multi-path communications, the first UE may experience a beam failure over one or more beams associated with the direct Uu link. As such, the UE may signal to the network entity through a random access channel (RACH) over the direct Uu link to establish a second beam for use. In some cases, however, use of a RACH may increase latency associated with the Uu direct link, increase power consumption at the first UE, and lead to potentially lost communications due to the performing of the beam failure recovery (BFR) procedure.

According to some aspects, the network may reduce the use of RACH for instances of BFR by utilizing the secondary link of the multi-path communication scheme. For example, the network entity may configure the first UE via control signaling (e.g., radio resource control (RRC) signaling) with one or more parameters indicating signaling content to include in a beam failure detection (BFD) message or a beam failure warning message (which may indicate that a beam failure may occur in the future based on one or more metrics) in accordance with a beam failure reporting procedure. For example, the one or more parameters may indicate for the first UE to include one bit of beam failure flag/beam failure warning flag, reasons for a beam failure warning, a BFD status, a set of triggering conditions to determine a BFD or a beam failure warning, a requested response to the beam failure message, or information associated with one or more beams.

In some examples, the first UE may operate in accordance with an unconditional beam failure reporting procedure where the first UE may transmit beam failure related information associated with the one or more parameters via both the direct link and the secondary link concurrently. In some examples, the first UE may operate in accordance with a conditional beam failure reporting procedure where the first UE may initially transmit beam failure related information via either the direct link or the secondary link, start a timer, and if the timer expires before the first UE receives a response, the first UE may transmit beam failure related information via the other link. In some cases, the first UE may perform respective BFR procedures via RACH on the direct link and via a medium access control-control element (MAC-CE) message on the second link. In some examples, the network entity may cancel the BFR procedure on the direct link or the secondary link based on the order in which the network receives indication of BFR from each respective link (e.g., via an implicit cancelation or explicit cancelation).

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to utilization of secondary link for beam failure warning and recovery.

FIG. 1 illustrates an example of a wireless communications system 100 that supports utilization of secondary link for beam failure warning and recovery in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support utilization of secondary link for beam failure warning and recovery as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples of wireless communications system 100, a first UE 115 may communicate with a network entity 105 via a direct Uu link and communicate with the network entity 105 via a second UE 115 (e.g., a relay UE 115) via a secondary link (e.g., a sidelink between the first and second UE 115 and a Uu link between the second UE 115 and the network entity). In multi-path communications, the first UE 115 may experience a beam failure over one or more beams associated with the direct Uu link.

In some examples, the wireless communications system 100 may reduce the use of RACH for instances of BFR by utilizing the secondary link of the multi-path communication scheme. For example, the network entity may configure the first UE 115 via control signaling (e.g., RRC signaling) with one or more parameters indicating signaling content to include in a BFD message or a beam failure warning message in accordance with a beam failure reporting procedure.

In some examples, the first UE 115 may operate in accordance with an unconditional beam failure reporting procedure (e.g., as described with reference to FIG. 3) where the first UE 115 may transmit beam failure related information associated with the one or more parameters via both the direct link and the secondary link concurrently. In some examples, the first UE 115 may operate in accordance with a conditional beam failure reporting procedure (e.g., as described with reference to FIG. 4) where the first UE 115 may initially transmit beam failure related information via either the direct link or the secondary link, start a timer, and if the timer expires before the first UE 115 receives a response, the first UE 115 may transmit beam failure related information via the other link. In some cases, the first UE 115 may perform respective BFR procedures via RACH on the direct link and via a MAC-CE message on the second link (e.g., as described with reference to FIGS. 5-7). In some examples, the network entity 105 may cancel the BFR procedure on the direct link or the secondary link based on the order in which the network receives indication of BFR from each respective link (e.g., via an implicit cancelation or explicit cancelation).

Figure 2:
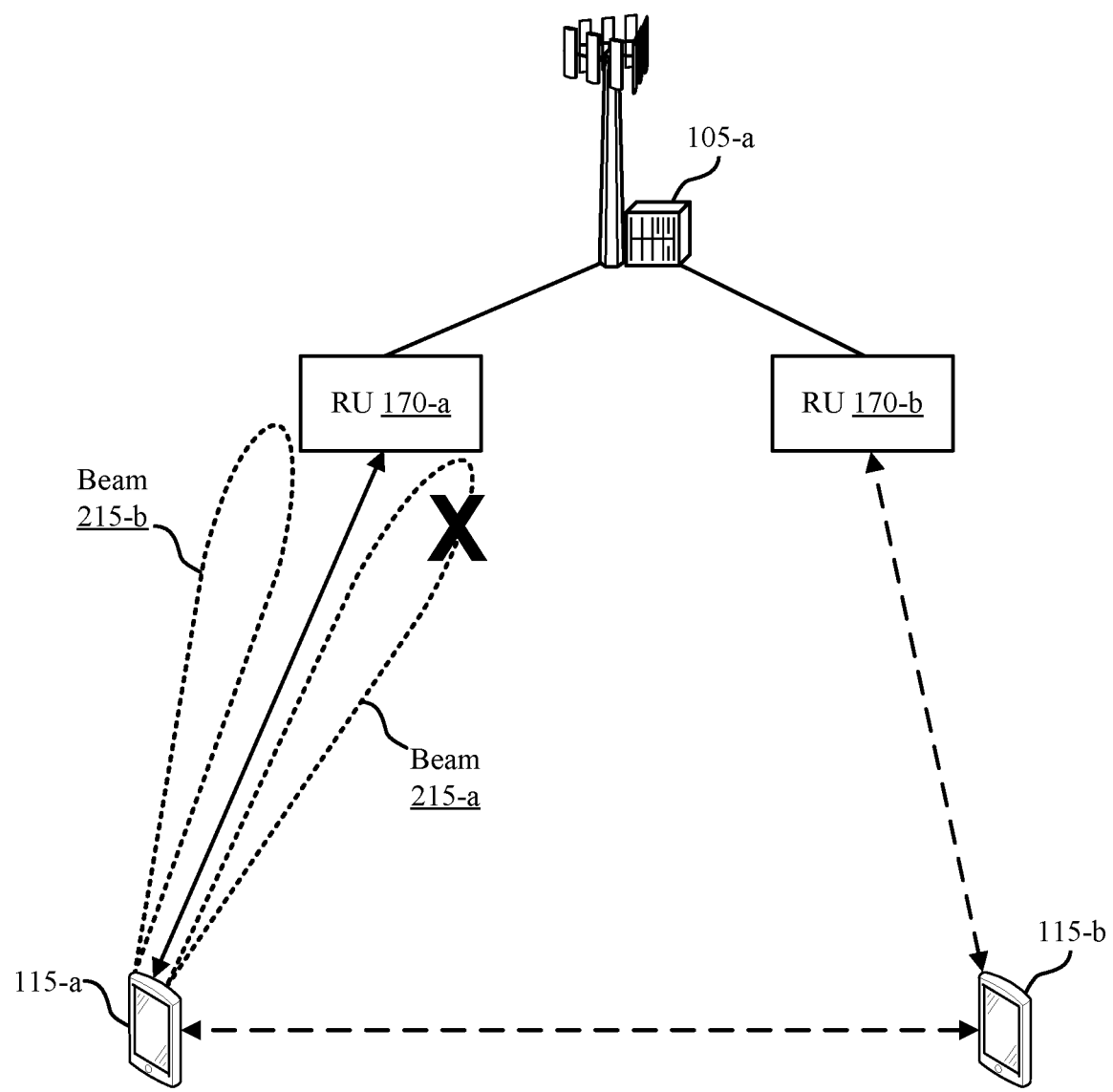
FIG. 2 illustrates an example of a wireless communications system that supports utilization of secondary link for beam failure warning and recovery in accordance with one or more aspects of the present disclosure.

FIG. 2 illustrates an example of a wireless communications system 200 that supports utilization of secondary link for beam failure warning and recovery in accordance with one or more aspects of the present disclosure. In some examples, wireless communications system 200 may implement one or more aspects of wireless communications system 100. For instance, a UE 115-a, a UE 115-b, and a network entity 105-a may be respective examples of UEs 115 and a network entity 105, with reference to FIG. 1. Additionally, or alternatively, an RU 170-a and an RU 170-b may be associated with the network entity 105-a and be examples of RUs 170 with reference to FIG. 1. In some examples, the RU 170-a and the RU 170-b may be connected to one or more CUs 160 associated with the network entity 105-a. While examples are discussed herein, any number of devices and device types may be used to implement techniques described in the present disclosure.

Wireless communications system 200 may support multi-path communications between the UE 115-a and the network entity 105-a via a direct link 205 and a secondary link 210. In some examples, the UE 115-a may utilize the secondary link 210 to aid in the transmission of beam failure information associated with one or more beams 215 of the direct link 205.

As illustrated in wireless communications system 200, the UE 115-a may operate in accordance with a multi-path communications in which the UE 115-a may be connected with both the UE 115-b (e.g., a relay UE 115) and the network entity 105-a. In some examples, the UE 115-a and network entity 105-a may communicate wireless messages through the direct link 205, the secondary link 210, or a combination thereof. For instance, the direct link 205 may be an example of a Uu link in which the UE 115-a and network entity 105-a may communicate data via one or more beams 215 using one or more beamforming techniques described herein. In some examples, the network entity 105-a may communicate via the direct link 205 using the RU 170-a which may host the L1 or L2 protocol layers. Additionally, or alternatively, the secondary link 210 may include a first portion of the secondary link 210 between the UE 115-b and the network entity 105-a which may be an example of a Uu link and a second portion of the secondary link 210 between the UE 115-b and the UE 115-a, which may be an example of a sidelink (e.g., in accordance with a PC5 interface). In some examples, the network entity 105-a may communicate via the secondary link 210 using the RU 170-b which may host the L1 or L2 protocol layers. As such, the UE 115-a and the UE 115-b may be connected to the same network entity 105-a using RU 170-a and RU 170-b respectively. By utilizing a multi-path communication scheme, the UE 115-a and network entity 105-a may benefit from increased link diversity and improved reliability of wireless communications.

In some cases, the UE 115-a and the network entity 105-a may experience beam failure over one or more beams 215 associated with the direct link 205. For example, as illustrated in FIG. 2, the UE may identify a beam failure occasion for beam 215-a. In some examples, the UE 115-a and the network entity 105-a may perform a BFR procedure via a RACH over the direct link 205 to establish a second beam 215 for use (e.g., a beam 215-b). However, the use of a RACH over the direct link 205 may increase latency associated with the Uu direct link 205, increase power consumption at the UE 115-a, and lead to potentially lost communications due to the performing of the BFR procedure. For instance, a contention free RACH may use a pre-allocated preamble which may increase resource use over the direct link 205. Additionally, or alternatively, a contention based RACH may use multiple messages between the UE 115-a and the network entity 105-a (e.g., two, three, four or more rounds of handshakes), which may increase power consumption and latency.

As such, the wireless communications system 200 may reduce the use of RACH for instances of BFR by utilizing the secondary link 210 of the multi-path communication scheme. For example, the network entity 105-a may configure the UE 115-a via control signaling (e.g., RRC signaling) with one or more parameters indicating signaling content to include in a BFD message or a beam failure warning message as part of a beam failure reporting procedure. For example, the one or more parameters may indicate for the UE 115-a to include one bit of beam failure flag/beam failure warning flag, reasons for a beam failure warning, a BFD status, a set of triggering conditions to determine a BFD or a beam failure warning, a requested response to the beam failure message, or information associated with one or more beams 215. Further descriptions of signaling content associated with the beam failure reporting procedure are described herein, including with reference to FIGS. 3 and 4.

In some examples, the UE 115-*a* may operate in accordance with an unconditional beam failure reporting procedure where the UE 115-*a* may transmit beam failure related information associated with the one or more parameters via both the direct link 205 and the secondary link 210 concurrently. Further discussion of the unconditional beam failure reporting procedure is described herein, including with reference to FIG. 3.

Additionally, or alternatively, the UE 115-*a* may operate in accordance with a conditional beam failure reporting procedure where the UE 115-*a* may initially transmit beam failure related information via either the direct link 205 or the secondary link 210, start a timer, and if the timer expires before the UE 115-*a* receives a response, the UE 115-*a* transmits beam failure related information via the other link. Further discussion of the conditional beam failure reporting procedure is described herein, including with reference to FIG. 4.

Additionally, or alternatively, the UE 115-*a* may perform BFR via the direct link 205, the secondary link 210, or both. For instance, the UE 115-*a* may transmit via the secondary link 210, BFR MAC-CE content. In some examples, the BFR MAC-CE content may include an indication of BFD on the direct link 205, an indication of information associated with a second beam 215 to use, and a direct link 205 channel condition measurement history.

In some examples, the UE 115-*a* may refrain from conducting a BFR procedure via RACH over the primary link and transmit the BFR MAC-CE content via the secondary link 210. As such, the UE 115-*a* and the network entity 105-*a* may identify and switch to a second beam 215 based on communications relayed by the UE 115-*b* via the secondary link 210. Further discussion of transmission of BFR MAC-CE content via the secondary link 210, is described herein including with reference to FIG. 5.

In some examples, the UE 115-*a* may concurrently perform a BFR procedure via RACH on the direct link 205 and transmit BFR MAC-CE content via the secondary link 210. If the network entity 105-*a* receives the BFR MAC-CE content via the secondary link 210 before receiving the BFR MAC-CE content via the RACH, the network entity 105-*a* may cancel the RACH and establish a second beam 215 for use with the UE 115-*a* via the secondary link 210. If the network entity 105-*a* receives the BFR MAC-CE content via the RACH on the direct link 205 before receiving the BFR MAC-CE content via the secondary link 210, the network entity 105-*a* may cancel the BFR on the secondary link 210 and establish a second beam for use with the UE 115-*a* via the RACH on the direct link 205. Further discussion of concurrent BFR procedures via the direct link 205 and the secondary link 210 are described herein, including with reference to FIGS. 6 and 7.

In some examples, the network entity 105-*a* may also configure the UE 115-*a* with what signaling content (e.g., information) to include in beam failure related messages based on which link is used for transmission. For example, if L1 signaling is used (e.g., uplink control information (UCI)) on the direct link 205 or the secondary link 210, the beam failure related message may utilize various UCI formats, may include a one bit beam failure flag, and one or more sets of information associated with the one or more configured parameters as described herein, with reference to FIGS. 3 and 4. Additionally, or alternatively, if L2 signaling is used (e.g., MAC-CE) on the direct link 205 or the secondary link 210, the beam failure related message may utilize various MAC-CE formats, and may include one or more sets of information associated with the one or more configured parameters as described herein, with reference to FIGS. 3 and 4.

In some cases, the network entity 105-*a* may configure the UE 115-*a* with a list of available signal methods and related signaling content for a given beam failure reporting procedure. In such cases, different configurations IDs may be associated with the different signaling methods and related signaling content. In some examples, the network entity 105-*a* may indicate for the UE 115-*a* to switch between the multiple signaling method configurations via transmission of a MAC-CE, downlink control information (DCI), or RRC.

Figure 3:
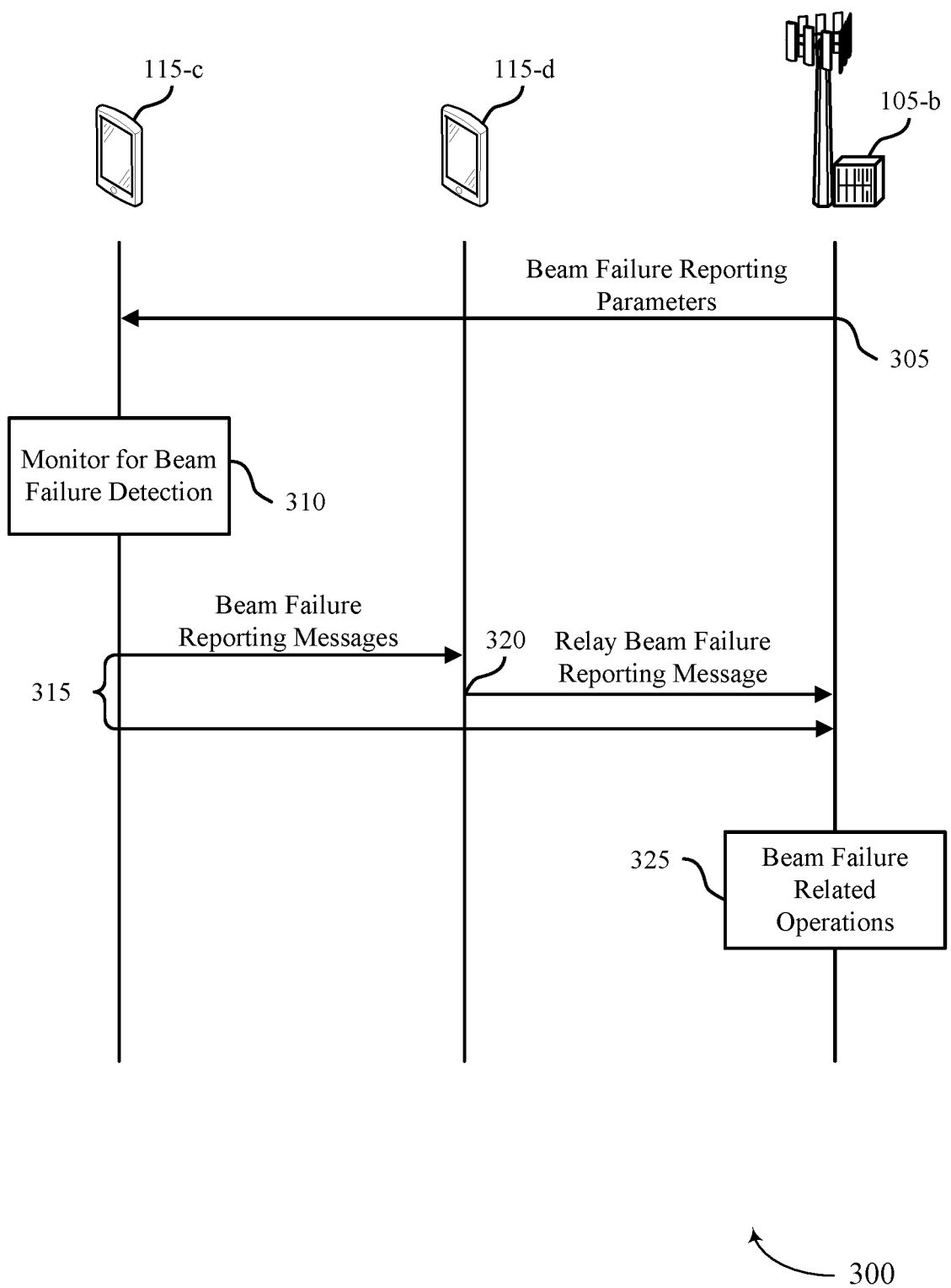
FIG. 3 illustrates an example of a process flow that supports utilization of secondary link for beam failure warning and recovery in accordance with one or more aspects of the present disclosure.

FIG. 3 illustrates an example of a process flow 300 that supports utilization of secondary link for beam failure warning and recovery in accordance with one or more aspects of the present disclosure. In some examples, process flow 300 may implement aspects of wireless communications system 100, wireless communications system 200, or a combination thereof. Process flow 300 includes a UE 115-*c*, a UE 115-*d*, and a network entity 105-*b*, which may be respective examples of UEs 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 300 shows processes between two UEs 115 and a single network entity 105, it should be understood that these processes may occur between any number of wireless devices, network devices, and/or network device types.

At 305, the network entity 105-*b* may transmit to the UE 115-*c* a control signal that may indicate one or more parameters for a beam failure reporting procedure for use at the UE 115-*c*. The network entity 105-*b* may transmit the control signal using one or more CUs 160, DUs 165, RUs 170, or a combination thereof. In some examples, the beam failure reporting procedure associated with a multi-path wireless connection for a cell for the UE 115-*c*. In some examples, the multi-path wireless connection may include a first link (e.g., a direct link) between the UE 115-*c* and the network entity 105-*b* and a second link (e.g., a secondary link) between the UE 115-*c* and the UE 115-*d*, where the UE 115-*d* may serve as a relay UE 115 for communications between the UE 115-*c* and the network entity 105-*b*.

In some cases, the one or more parameters may indicate information for the UE 115-*c* to include in messages associated with the beam failure reporting procedure. For example, the one or more parameters may indicate for the UE 115-*c* to transmit as part of a beam failure information message one bit of a beam failure flag in instances of BFD for a beam or one bit of a beam failure warning flag (e.g., where a bit value of 0 indicates no beam failure warning and a bit value of 1 indicates a beam failure warning) in instances where the UE 115-*c* predicts possible beam failure for a beam.

Additionally, or alternatively, the one or more parameters may indicate for the UE 115-*c* to include in the beam failure information message reasons for a beam failure warning. Examples of reasons for the beam failure warning may include predicted beam blocking of the first beam, a channel strength measurement being below a quality threshold, among other examples.

Additionally, or alternatively, the one or more parameters may indicate for the UE 115-*c* to include in the beam failure information message a BFD status. In some examples, the BFD status may include a beam failure indication (BFI) count, a BFI history over a configured duration of time, among other examples.

Additionally, or alternatively, the one or more parameters may configure the UE 115-c with a set of triggering conditions to identify either a BFD or a beam failure warning. For example, the set of triggering conditions may include methods for the UE 115-c to predict beam failure which may include artificial intelligence or machine learning techniques. In some examples, the triggering conditions may configure a threshold for a consecutive number of BFI recorded, where if a consecutive number of BFI recorded exceeds a first threshold, the UE 115-c may identify a beam failure warning for the beam and if the BFI recorded exceeds a second threshold, the UE 115-c may identify a BFD for the beam. In some examples, the triggering conditions may configure a channel strength threshold associated with a channel of the beam, where if the channel strength is below a first threshold, the UE 115-c may identify a beam failure warning for the beam and if the channel strength is below a second threshold, the UE 115-c may identify a BFD for the beam. As such, the one or more parameters may also indicate for the UE 115-c to include in the beam failure information message reasons for predicted beam failure, a consecutive number of BFI recorded, a channel strength measurement, or a combination thereof.

Additionally, or alternatively, the one or more parameters may indicate for the UE 115-c to include in the beam failure information message a requested response from the network entity 105-b. In some examples, the contents of the requested response may include, a beam switch indication, an adjustment for a pattern, location, or frequency of a BFD reference signal, or a combination thereof.

Additionally, or alternatively, the one or more parameters may indicate for the UE 115-c to include in the beam failure information message one or more beam preferences associated with the UE 115-c.

At 310, the UE 115-c may monitor, as part of a multi-path beam failure recovery procedure, the first link for one or more signals associated with BFD based on receiving the control signal.

At 315, the UE 115-c may concurrently transmit a first message and a second message based on the beam failure reporting procedure being an unconditional beam failure reporting procedure. For example, the UE 115-c may transmit the first message via the first link, where the first message may include at least a first portion of information associated with the one or more parameters, where the first message is of a first message type including one of an L1 type or an L2 type. Additionally, or alternatively, the UE 115-c may transmit the second message via the second link, where the second message may include at least a second portion of information associated with the one or more parameters, where the second message is of a second message type including one of an L1 type or an L2 type. In some examples, the UE 115-c may be configured to send the first message and the second message concurrently based on RRC configuration (e.g., based on the control signal received at 305, or another RRC message).

In some examples, the UE 115-c may transmit the first message including a first MAC-CE indicating the first portion of the information, and transmit the second message including a second MAC-CE indicating the second portion of the information. In some examples, the first portion of the information and the second portion of the information may be a same information based on the control signal indicating to use a same information. In some examples, the first portion of the information and the second portion of the information may be different information based on the control signal indicating to use different information. In some examples, multiple combinations of information signaled on the first link and the second link may also be configured by RRC.

In some examples, the UE 115-c may transmit the first message including a MAC-CE indicating the first portion of the information, and transmit the second message including UCI indicating the second portion of the information. In such examples, the MAC-CE on the first link may deliver more information than the UCI on the second link, based on network configuration.

In some examples, the UE 115-c may transmit the first including UCI indicating the first portion of the information, and transmit the second message including a MAC-CE indicating the second portion of the information.

In some examples, the UE 115-c may transmit the first message including a first UCI indicating the first portion of the information, and transmit the second message including a second UCI indicating the second portion of the information. In some examples, the first portion of the information and the second portion of the information may be a same information based on the control signal indicating to use a same information. In some examples, the first portion of the information and the second portion of the information may be different information based on the control signal indicating to use different information. In some examples, multiple combinations of information signaled on the first link and the second link may also be configured by RRC.

At 320, the UE 115-d may receive the second message from the UE 115-c and relay the second message to the network entity 105-b. As such, the network entity 105-b may receive the first message via the first link and receive the second message via the second link. The network entity 105-b may receive the first and second messages using one or more CUs 160, DUs 165, RUs 170, or a combination thereof.

At 325, the network entity 105-b may perform beam failure operations in accordance with the first information received in the first message and the second information received in the second message. For example, if the first information or the second information indicate for the network entity 105-b to transmit a response message, the network entity 105-b may transmit the response message in accordance with the first information and the second information. In some instances, the network entity 105-b may transmit a response message via the first link, a response message via the second link, or a combination thereof.

Figure 4:
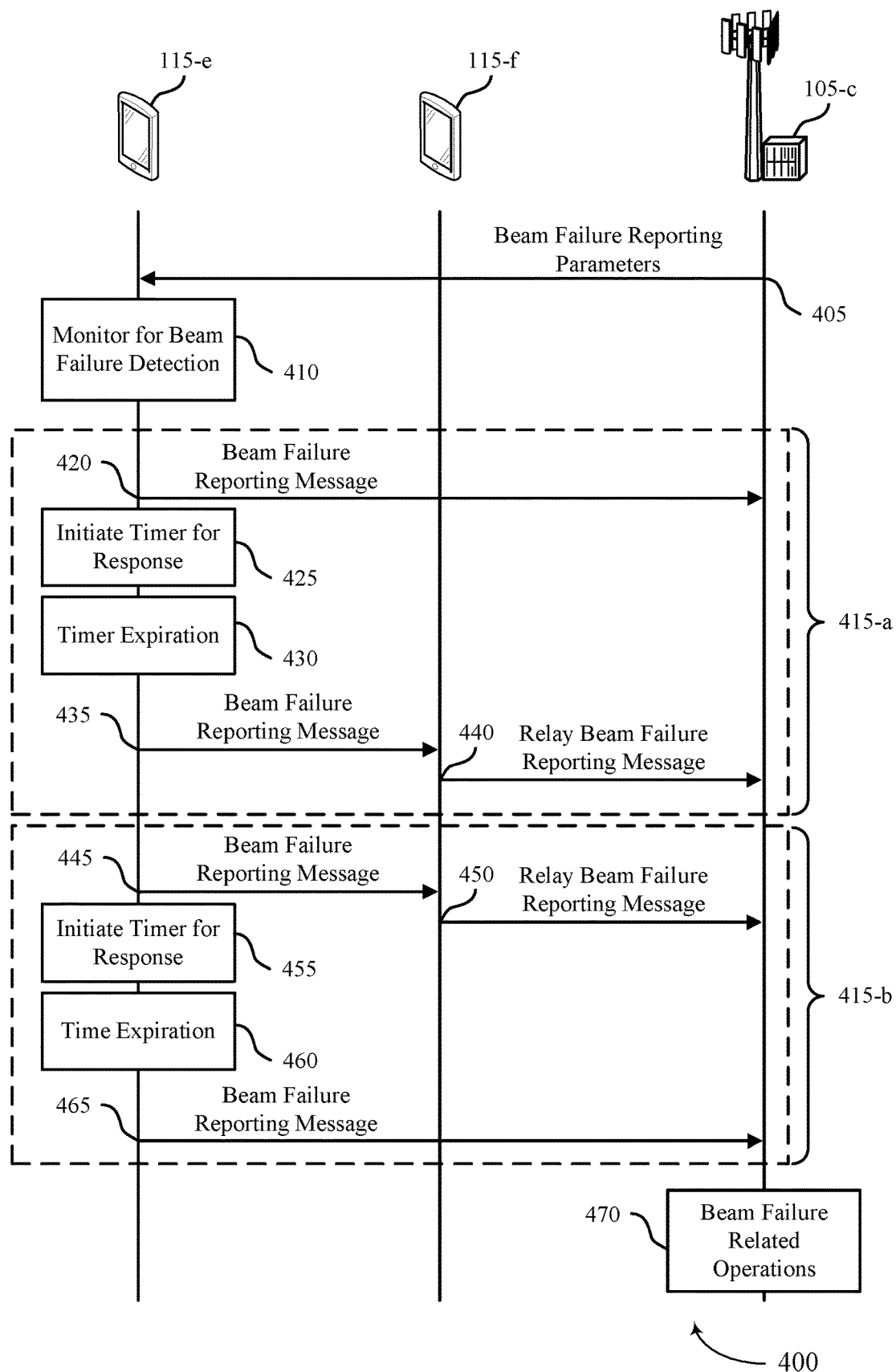
FIG. 4 illustrates an example of a process flow that supports utilization of secondary link for beam failure warning and recovery in accordance with one or more aspects of the present disclosure.

FIG. 4 illustrates an example of a process flow 400 that supports utilization of secondary link for beam failure warning and recovery in accordance with one or more aspects of the present disclosure. In some examples, process flow 400 may implement aspects of wireless communications system 100, wireless communications system 200, or a combination thereof. Process flow 400 includes a UE 115-e, a UE 115-f, and a network entity 105-c, which may be respective examples of UEs 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 400 shows processes between two UEs 115 and a single network entity 105, it should be understood that these processes may occur between any number of wireless devices, network devices, and/or network device types.

At 405, the network entity 105-c may transmit to the UE 115-e a control signal that may indicate one or more parameters for a beam failure reporting procedure for use at the UE 115-e. The network entity 105-c may transmit the control signal using one or more CUs 160, DUs 165, RUs 170, or a combination thereof. In some examples, the beam failure reporting procedure associated with a multi-path wireless connection for a cell for the UE 115-e. In some examples, the multi-path wireless connection may include a first link (e.g., a direct link) between the UE 115-e and the network entity 105-c and a second link (e.g., a secondary link) between the UE 115-e and the UE 115-f, where the UE 115-f may serve as a relay UE 115 for communications between the UE 115-e and the network entity 105-c.

In some cases, the one or more parameters may indicate information for the UE 115-e to include in messages associated with the beam failure reporting procedure. For example, the one or more parameters may indicate for the UE 115-e to transmit as part of a beam failure information message one bit of a beam failure flag in instances of BFD for a beam or one bit of a beam failure warning flag in instances where the UE 115-e predicts possible beam failure for a beam.

Additionally, or alternatively, the one or more parameters may indicate for the UE 115-e to include in the beam failure information message reasons for a beam failure warning. Examples of reasons for the beam failure warning may include, predicted beam blocking of the first beam, a channel strength measurement being bellow a quality threshold, among other examples.

Additionally, or alternatively, the one or more parameters may indicate for the UE 115-e to include in the beam failure information message a BFD status. In some examples, the BFD status may include a BFI count, a BFI history over a duration of time, among other examples.

Additionally, or alternatively, the one or more parameters may configure the UE 115-e with a set of triggering conditions to identify either a BFD or a beam failure warning. For example, the set of triggering conditions may include methods for the UE 115-e to predict beam failure which may include artificial intelligence or machine learning techniques. In some examples, one of the triggering conditions may be associated with a BFI count. For instance, the UE 115-e may perform one or more quality measurements (e.g., a signal-to-interference-plus-noise ratio (SINR) measurement, reference signal received power (RSRP)) of the first beam. If a quality measurement fails to satisfy a quality threshold, a PHY layer of the UE 115-e may send a BFI to a MAC layer of the UE 115-e, where the MAC layer may initiate a BFI counter and increment the BFI count by one. In some cases, a triggering condition be associated with a threshold for a consecutive number of BFI recorded, where if a consecutive number of BFIs recorded exceeds a first threshold, the UE 115-e may identify a beam failure warning for the beam and transmit an indication of the beam failure warning (e.g., to the network entity 105-c). If the BFI recorded exceeds a second threshold, the UE 115-e may identify a BFD for the beam. In some examples, the UE 115-e may transmit an indication to the network entity 105-c (e.g., via the first link or the second link) of the BFI count if the number of consecutive BFI recorded exceeds the first threshold or the second threshold.

In some examples, the triggering conditions may configure a channel strength threshold associated with a channel of the beam, where if the channel strength is below a first threshold, the UE 115-e may identify a beam failure warning for the beam and if the channel strength is below a second threshold, the UE 115-e may identify a BFD for the beam. As such, the one or more parameters may also indicate for the UE 115-e to include in the beam failure information message reasons for predicted beam failure, a consecutive number of BFI recorded, a channel strength measurement, or a combination thereof.

Additionally, or alternatively, the one or more parameters may indicate for the UE 115-e to include in the beam failure information message a requested response from the network entity 105-c. In some examples, the contents of the requested response may include, a beam switch indication, an adjustment for a pattern, location, or frequency of a BFD reference signal, or a combination thereof.

Additionally, or alternatively, the one or more parameters may indicate for the UE 115-e to include in the beam failure information message one or more beam preferences associated with the UE 115-e.

At 410, the UE 115-e may monitor, as part of a multi-path beam failure recovery procedure, the first link for one or more signals associated with BFD based on receiving the control signal. Based on monitoring as part of a multi-path beam failure recovery procedure, the UE 115-e may determine to transmit, via the first link or the second link, one or more messages in accordance with the beam failure reporting procedure, the one or more messages may include information associated with the one or more parameters.

In some examples, the UE 115-e may transmit the one or more messages in accordance with beam failure reporting configuration 415-a. In such examples, at 420, the UE 115-e may transmit a first message of the one or more messages via the first link. In some examples, first message of the one or messages may include at least a first portion of the information associated with the one or more parameters, where the first message is of a first message type including one of an L1 type or an L2 type.

At 425, the UE 115-e may initiate a timer after transmitting the first message on the beam failure reporting procedure being a conditional beam failure reporting procedure. In some examples, the value of the timer may be configured by the network. For instance, the network entity 105-c may transmit to the UE 115-e, an indication of a timer duration for the timer via a MAC-CE, via DCI, or via an RRC signal. The network entity 105-c may transmit the indication of the timer duration using one or more CUs 160, DUs 165, RUs 170, or a combination thereof.

At 430, the configured timer may expire at the UE 115-e before the UE 115-e receives a response to the first message from the network entity 105-c.

At 435, the UE 115-e may transmit, via the second link, a second message of the one or more messages upon expiration of the timer. In some examples, the second message of the one or messages may include at least a second portion of the information associated with the one or more parameters, where the second message is of a second message type including one of an L1 type or an L2 type.

At 440, the UE 115-f may receive the second message from the UE 115-e and relay the second message to the network entity 105-d.

In some examples, the UE 115-e may transmit the one or more messages in accordance with beam failure reporting configuration 415-b. In such examples, at 445, the UE 115-e may transmit the second message of the one or more messages via the second link.

At 450, the UE 115-f may receive the second message from the UE 115-e and relay the second message to the network entity 105-d.

At 455, the UE 115-e may initiate a timer after transmitting the second message based on the beam failure reporting procedure being a conditional beam failure reporting procedure. In some examples, the value of the timer may be configured by the network. For instance, the network entity 105-c may transmit to the UE 115-e, an indication of a timer duration for the timer via a MAC-CE, via DCI, or via an RRC signal. The network entity 105-c may transmit the indication of the timer duration using one or more CUs 160, DUs 165, RUs 170, or a combination thereof.

At 460, the configured timer may expire at the UE 115-e before the UE 115-e receives a response to the second message from the network entity 105-c.

At 465, the UE may transmit, via the first link, the first message of the one or more messages upon expiration of the timer.

In some examples, the UE may operate in accordance with either the beam failure reporting configuration 415-a or the beam failure reporting configuration 415-b based on an indication included in the control signal at 405 or based on receiving another RRC configuration message. As such, the network entity 105-c may receive the first message via the first link and receive the second message via the second link. The network entity 105-c may receive the first and second messages using one or more CUs 160, DUs 165, RUs 170, or a combination thereof.

At 470, the network entity 105-c may perform beam failure operations in accordance with the first information received in the first message and the second information received in the second message. For example, if the first information or the second information indicate for the network entity 105-c to transmit a response message, the network entity 105-c may transmit the response message in accordance with the first information and the second information. In some instances, the network entity 105-c may transmit a response message via the first link, a response message via the second link, or a combination thereof.

In some examples, the UE 115-e may operate in accordance with the conditional beam failure reporting procedure as described with reference to FIG. 4, or operate in accordance with the unconditional beam failure reporting procedure, as described with reference to FIG. 5, based on RRC configuration messaging. Additionally, or alternatively, the first and second information included in the first and second messages respectively may be based on the RRC configuration messaging indicating the content to include in the first and second information.

In some examples, the UE 115-e may receive, in the control signal, an indication of the one or more parameters for the beam failure reporting procedure based on a latency associated with the one or more messages, a size of the one or more messages, an uplink resource availability, a quality of service parameter, or a combination thereof.

In some examples, the network entity 105-c may transmit to the UE 115-e, via a MAC-CE or via DCI, a signal that activates or deactivates the beam failure reporting procedure (e.g., conditional, or unconditional) for the UE 115-e. The network entity 105-c may transmit the signal using one or more CUs 160, DUs 165, RUs 170, or a combination thereof. Additionally, or alternatively, the UE 115-e may transmit, via a MAC-CE or via UCI, a signal that activates or deactivates the beam failure reporting procedure (e.g., conditional, or unconditional) for the UE 115-e. The network entity 105-c may receive the signal using one or more CUs 160, DUs 165, RUs 170, or a combination thereof.

Figure 5:
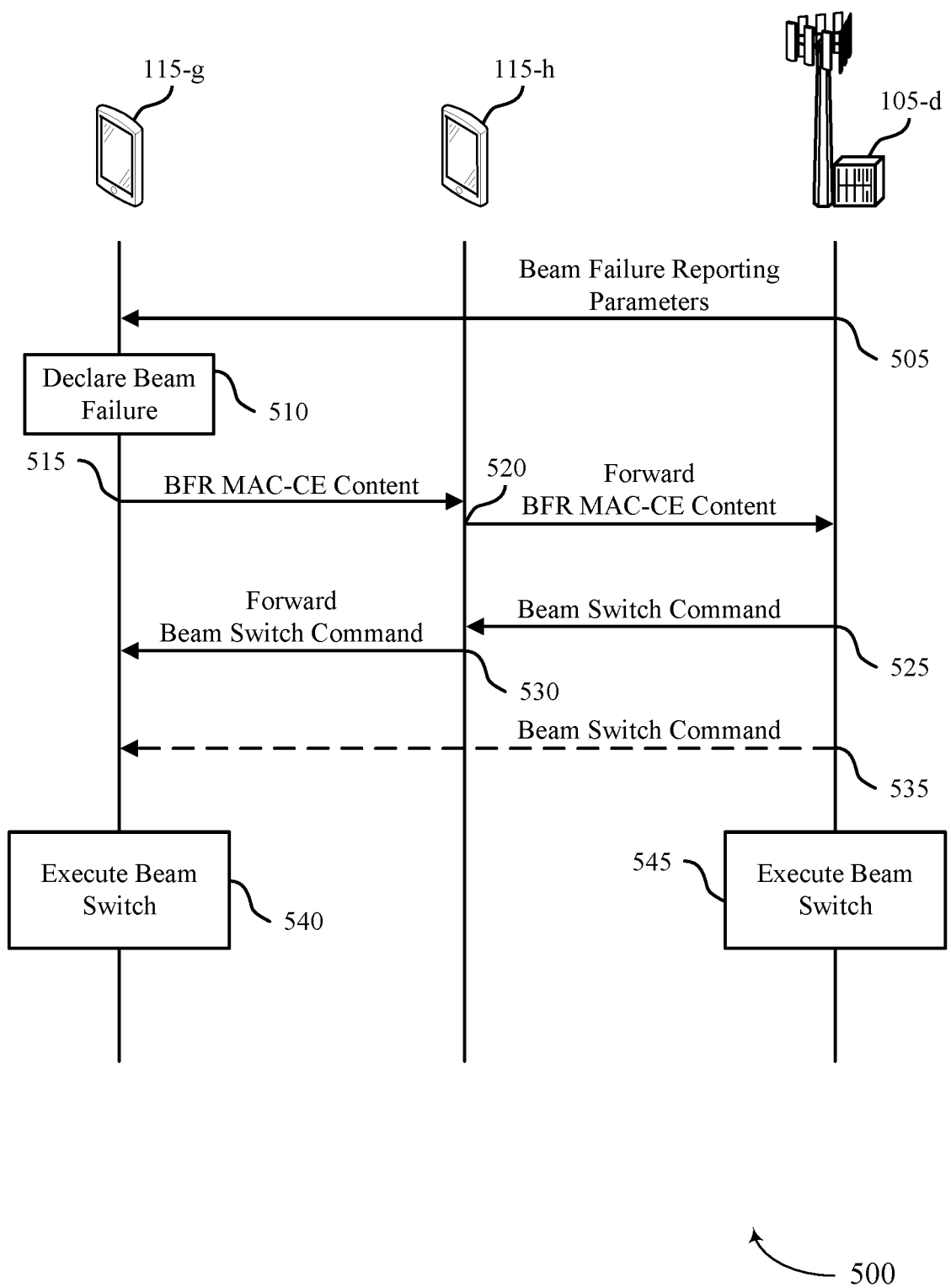
FIG. 5 illustrates an example of a process flow that supports utilization of secondary link for beam failure warning and recovery in accordance with one or more aspects of the present disclosure.

FIG. 5 illustrates an example of a process flow 500 that supports utilization of secondary link for beam failure warning and recovery in accordance with one or more aspects of the present disclosure. In some examples, process flow 500 may implement aspects of wireless communications system 100, wireless communications system 200, or a combination thereof. Process flow 500 includes a UE 115-g, a UE 115-h, and a network entity 105-d, which may be respective examples of UEs 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 500 shows processes between two UEs 115 and a single network entity 105, it should be understood that these processes may occur between any number of wireless devices, network devices, and/or network device types.

At 505, the network entity 105-d may transmit to the UE 115-g a control signal that may indicate one or more parameters for a beam failure reporting procedure for use at the UE 115-g. The network entity 105-d may transmit the control signal using one or more CUs 160, DUs 165, RUs 170, or a combination thereof. In some examples, the beam failure reporting procedure associated with a multi-path wireless connection for a cell for the UE 115-g. In some examples, the multi-path wireless connection may include a first link (e.g., a direct link) between the UE 115-g and the network entity 105-d and a second link (e.g., a secondary link) between the UE 115-g and the UE 115-h, where the UE 115-h may serve as a relay UE 115 for communications between the UE 115-g and the network entity 105-d.

At 510, the UE 115-g may identify and declare a beam failure for at least one beam associated with the first link. In some examples, the UE 115-g may declare the beam failure based on one or more characteristics of the beam satisfying one or more of the parameters received at 505. As such, the UE 115-g may coordinate with the network entity 105-d to use a different beam associated with the first link. In some cases, however, the UE 115-g may be unable to perform beam coordination via the first link if there is not a configured HARQ process between the UE 115-g and the network entity 105-d. As such, a different beam may be indicated by using the second link. In some examples, the UE may determine to use the second link for BFR instead of the first link based on the link quality of the second link being greater than the link quality of the first link.

At 515, the UE 115-g may transmit, via the second link, a MAC signal as part of a BFR procedure for a first beam of the first link (e.g., transmit BFR MAC-CE content). At 520, the UE 115-h may receive the BFR MAC-CE contents from the UE 115-h and forward the BFR MAC-CE contents to the network entity 105-d. As such, the network entity 105-d may receive the BFR MAC-CE contents using one or more CUs 160, DUs 165, RUs 170, or a combination thereof.

At 525, the network entity 105-d may transmit, via the second link, a downlink beam switching command indicating a switch from the first beam of the first link to a second beam of the first link based on receiving the BFR MAC-CE contents. The network entity 105-d may transmit the downlink beam switching command using one or more CUs 160, DUs 165, RUs 170, or a combination thereof. At 530, the UE 115-h may receive the downlink beam switching command from the network entity 105-*d* and forward downlink beam switching command to the UE 115-*g*.

Additionally, or alternatively, at 535, the network entity 105-*d* may transmit directly to the UE 115-*g*, via the first link, the downlink beam switching command indicating a switch from the first beam of the first link to a second beam of the first link based on receiving the BFR MAC-CE contents. The network entity 105-*d* may transmit the downlink beam switching command using one or more CUs 160, DUs 165, RUs 170, or a combination thereof.

In some examples, the network entity 105-*d* may refrain from transmitting the beam switch command via the first link or the second link (e.g., refrain from performing 525, 530, and 535). As such, based on transmitting the BFR MAC-CE content at 515, the UE 115-*g* may monitor for a response form the network entity 105-*d* using the second beam indicated in the BFE MAC-CE content. Based on receiving the BFR MAC-CE content at 520, the network entity 105-*d* may transmit directly to the UE 115-*g* confirmation of the beam switching occasion using the second beam indicated in the received BFR MAC-CE content.

At 540, the UE 115-*g* may switch to the second beam indicated in the downlink beam switching command based on receiving the downlink beam switching command from the network entity 105-*d*.

At 545, the network entity 105-*d* may switch to the second beam indicated in the downlink beam switching command based on transmitting the downlink beam switching command via the first link, the second link, or both. In some examples, the network entity 105-*d* may wait a duration of time after transmitting the downlink beam switching command before switching to the second beam. In some instances, the duration of time may be dependent on the delay of propagation and the processing capabilities of the UE 115-*g*. In some instances, the duration of time may be dependent on which link (e.g., either the first link or the second link) the network entity 105-*d* uses to transmit the downlink beam switching command.

Figure 6:
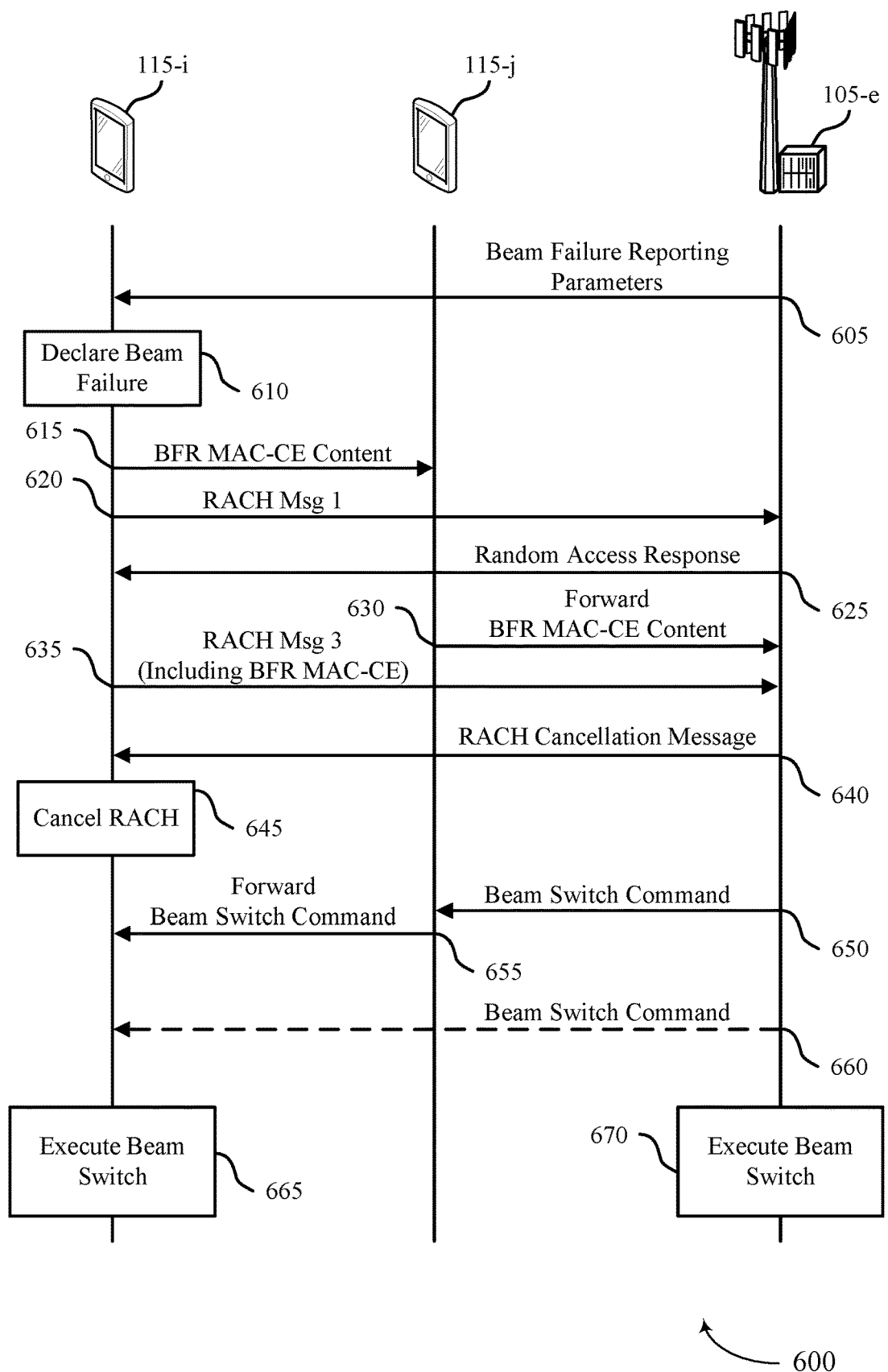
FIG. 6 illustrates an example of a process flow that supports utilization of secondary link for beam failure warning and recovery in accordance with one or more aspects of the present disclosure.

FIG. 6 illustrates an example of a process flow 600 that supports utilization of secondary link for beam failure warning and recovery in accordance with one or more aspects of the present disclosure. In some examples, process flow 600 may implement aspects of wireless communications system 100, wireless communications system 200, or a combination thereof. Process flow 600 includes a UE 115-*i*, a UE 115-*j*, and a network entity 105-*e*, which may be respective examples of UEs 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 600 shows processes between two UEs 115 and a single network entity 105, it should be understood that these processes may occur between any number of wireless devices, network devices, and/or network device types.

At 605, the network entity 105-*e* may transmit to the UE 115-*i* a control signal that may indicate one or more parameters for a beam failure reporting procedure for use at the UE 115-*i*. The network entity 105-*e* may transmit the control signal using one or more CUs 160, DUs 165, RUs 170, or a combination thereof. In some examples, the beam failure reporting procedure associated with a multi-path wireless connection for a cell for the UE 115-*i*. In some examples, the multi-path wireless connection may include a first link (e.g., a direct link) between the UE 115-*i* and the network entity 105-*e* and a second link (e.g., a secondary link) between the UE 115-*i* and the UE 115-*j*, where the UE 115-*j* may serve as a relay UE 115 for communications between the UE 115-*i* and the network entity 105-*e*.

At 610, the UE 115-*i* may identify and declare a beam failure for at least one beam associated with the first link. In some examples, the UE 115-*i* may declare the beam failure based on one or more characteristics of the beam satisfying one or more of the parameters received at 605. As such, the UE 115-*i* may coordinate with the network entity 105-*e* to use a different beam based on performing respective BFR procedures via the first link and the second link. By using both the first and second link, the network may benefit from a more reliable transmission and may provide the network entity 105-*e* with more options when responding to the UE 115-*i* with respect to the BFR procedures. In some examples, the UE 115-*i* may determine to perform BFR via both links based on a quality of service (QoS) parameter associated with transmissions for network being above a configured threshold.

At 615, the UE 115-*i* may transmit, via the second link, a MAC signal as part of a BFR procedure for the first beam of the first link (e.g., BFR MAC-CE contents).

At 620, the UE 115-*i* may transmit, via the first link, a random access message (e.g., RACH Msg 1) as part of a random access procedure based on a beam failure of a first beam of the first link, where the beam failure is detected based on the one or more parameters indicated by the control signal. The network entity 105-*e* may receive the random access message using one or more CUs 160, DUs 165, RUs 170, or a combination thereof. In some examples, the UE 115-*i* may perform 615 and 620 concurrently.

At 625, the network entity 105-*e* may transmit, via the first link, a random access message in response to the random access message received at 620. The network entity 105-*e* may transmit the random access response message using one or more CUs 160, DUs 165, RUs 170, or a combination thereof.

At 630, the UE 115-*j* may receive the BFR MAC-CE contents from the UE 115-*j* and forward the BFR MAC-CE contents to the network entity 105-*e*. As such, the network entity 105-*e* may receive the BFR MAC-CE contents using one or more CUs 160, DUs 165, RUs 170, or a combination thereof.

At 635, the network entity 105-*e* may receive from the UE 115-*i*, via the first link, a second random access message (e.g., RACH Msg. 3). The network entity 105-*e* may receive the second random access message using one or more CUs 160, DUs 165, RUs 170, or a combination thereof. In some examples, the second random access message may include the same BFR MAC-CE contents as transmitted by the UE 115-*i* at 615.

Based on receiving the BFR MAC-CE contents via the second link at 630 and receiving the BFR MAC-CE contents via the first link at 635, the network entity 105-*e* may determine to cancel the RACH. As such, at 640, the network entity 105-*e* may transmit a RACH cancelation message to the UE 115-*i*, via the first link. In some examples, the RACH cancelation message may be an example of an implicit indication in which the network entity 105-*e* refrains from transmitting the RACH cancelation message. As such, if the UE 115-*i* does not receive a response to the RACH Msg 3 transmitted at 635, before a configured duration, the UE 115-*i* may consider the lack of response as a RACH cancelation. At 645, the UE 115-*i* may cancel the RACH on the first link based on receiving the RACH cancelation message or implicitly identifying the RACH cancelation occasion.

At 650, the network entity 105-e may transmit, via the second link, a downlink beam switching command indicating a switch from the first beam of the first link to a second beam of the first link based on receiving the BFR MAC-CE contents. The network entity 105-e may transmit the downlink beam switching command using one or more CUs 160, DUs 165, RUs 170, or a combination thereof. At 655, the UE 115-j may receive the downlink beam switching command from the network entity 105-e and forward downlink beam switching command to the UE 115-i.

Additionally, or alternatively, at 660, the network entity 105-e may transmit directly to the UE 115-i, via the first link, the downlink beam switching command indicating a switch from the first beam of the first link to a second beam of the first link based on receiving the BFR MAC-CE contents. The network entity 105-e may transmit the downlink beam switching command using one or more CUs 160, DUs 165, RUs 170, or a combination thereof.

At 665, the UE 115-i may switch to the second beam indicated in the downlink beam switching command based on receiving the downlink beam switching command from the network entity 105-e.

At 670, the network entity 105-e may switch to the second beam indicated in the downlink beam switching command based on transmitting the downlink beam switching command via the first link, the second link, or both. In some examples, the network entity 105-e may wait a duration of time after transmitting the downlink beam switching command before switching to the second beam. In some instances, the duration of time may be dependent on the delay of propagation and the processing capabilities of the UE 115-i. In some instances, the duration of time may be dependent on which link (e.g., either the first link or the second link) the network entity 105-e uses to transmit the downlink beam switching command.

Figure 7:
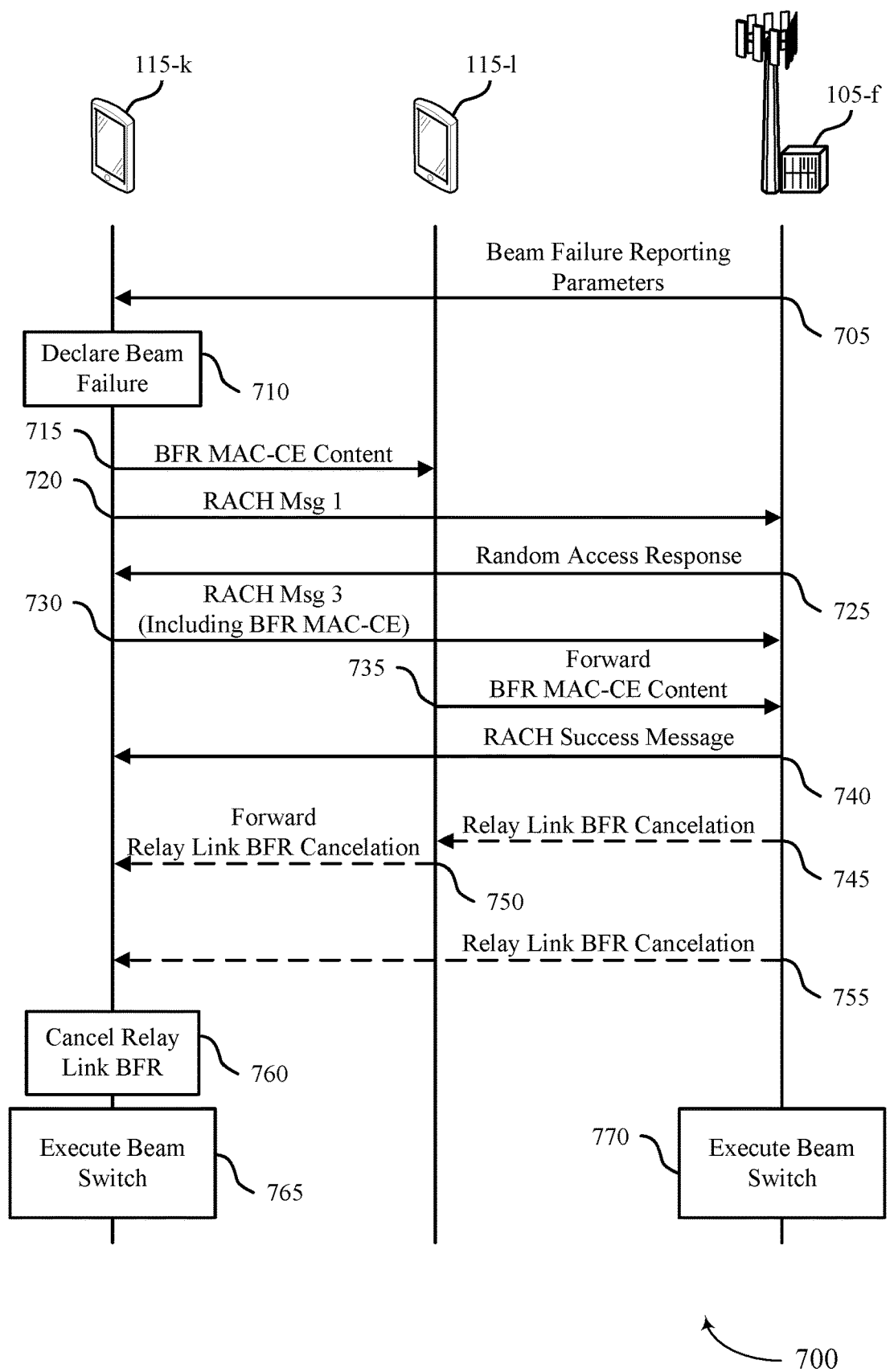
FIG. 7 illustrates an example of a process flow that supports utilization of secondary link for beam failure warning and recovery in accordance with one or more aspects of the present disclosure.

FIG. 7 illustrates an example of a process flow 700 that supports utilization of secondary link for beam failure warning and recovery in accordance with one or more aspects of the present disclosure. In some examples, process flow 700 may implement aspects of wireless communications system 100, wireless communications system 200, or a combination thereof. Process flow 700 includes a UE 115-k, a UE 115-l, and a network entity 105-f, which may be respective examples of UEs 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 700 shows processes between two UEs 115 and a single network entity 105, it should be understood that these processes may occur between any number of wireless devices, network devices, and/or network device types.

At 705, the network entity 105-f may transmit to the UE 115-k a control signal that may indicate one or more parameters for a beam failure reporting procedure for use at the UE 115-k. The network entity 105-f may transmit the control signal using one or more CUs 160, DUs 165, RUs 170, or a combination thereof. In some examples, the beam failure reporting procedure associated with a multi-path wireless connection may be for a cell for the UE 115-k. In some examples, the multi-path wireless connection may include a first link (e.g., a direct link) between the UE 115-k and the network entity 105-f and a second link (e.g., a secondary link) between the UE 115-k and the UE 115-l, where the UE 115-l may serve as a relay UE 115 for communications between the UE 115-k and the network entity 105-f.

At 710, the UE 115-k may identify and declare a beam failure for at least one beam associated with the first link. In some examples, the UE 115-k may declare the beam failure based on one or more characteristics of the beam satisfying one or more of the parameters received at 705. As such, the UE 115-k may coordinate with the network entity 105-f to use a different beam based on performing respective BFR procedures via the first link and the second link. By using both the first and second link, the network may benefit from a more reliable transmission and may provide the network entity 105-f with more options when responding to the UE 115-k with respect to the BFR procedures. In some examples, the UE 115-k may determine to perform BFR via both links based on a QoS parameter associated with transmissions for network being above a configured threshold.

At 715, the UE 115-k may transmit, via the second link, a MAC signal as part of a BFR procedure for the first beam of the first link (e.g., BFR MAC-CE contents).

At 720, the UE 115-k may transmit, via the first link, a random access message (e.g., RACH Msg 1) as part of a random access procedure based on a beam failure of a first beam of the first link, where the beam failure is detected based on the one or more parameters indicated by the control signal. The network entity 105-f may receive the random access message using one or more CUs 160, DUs 165, RUs 170, or a combination thereof. In some examples, the UE 115-k may perform 715 and 720 concurrently.

At 725, the network entity 105-f may transmit, via the first link, a random access message in response to the random access message received at 720. The network entity 105-f may transmit the random access response message using one or more CUs 160, DUs 165, RUs 170, or a combination thereof.

At 730, the network entity 105-f may receive from the UE 115-k, via the first link, a second random access message (e.g., RACH Msg. 3). The network entity 105-f may receive the second random access message using one or more CUs 160, DUs 165, RUs 170, or a combination thereof. In some examples, the second random access message may include the same BFR MAC-CE contents as transmitted by the UE 115-k at 715.

At 735, the UE 115-l may receive the BFR MAC-CE contents from the UE 115-l and forward the BFR MAC-CE contents to the network entity 105-f. As such, the network entity 105-f may receive the BFR MAC-CE contents using one or more CUs 160, DUs 165, RUs 170, or a combination thereof.

Based on receiving the BFR MAC-CE contents via the first link at 730 and receiving the BFR MAC-CE contents via the second link at 735, the network entity 105-f may determine to cancel BFR via the second link and complete the RACH procedure. As such, at 740, the network entity 105-f may transmit a RACH success message to the UE 115-k, via the first link.

At 745, the network entity 105-f may transmit, via the second link, an indication of BFR cancelation for the second link based on transmitting the RACH success message. The network entity 105-f may transmit the indication using one or more CUs 160, DUs 165, RUs 170, or a combination thereof. At 750, the UE 115-l may receive the indication from the network entity 105-f and forward indication to the UE 115-k.

Additionally, or alternatively, at 755, the network entity 105-f may transmit directly to the UE 115-k, via the first link, the indication of BFR cancelation for the second link. The network entity 105-*f* may transmit the indication using one or more CUs 160, DUs 165, RUs 170, or a combination thereof.

At 760, the UE 115-*k* may cancel the BFR procedure for the second link based on receiving the indication of BFR cancelation for the second link. In some examples, the BFR cancelation for the second link may be an example of an implicit indication in which the network entity 105-*f* may refrain from transmitting a response to the BFR sent over the second link (e.g., refrain from performing 745 or 755). If the UE 115-*k* does not receive a response to the BFR MACE-CE content transmitted at 715, before a configured duration, the UE 115-*k* may consider the lack of response as a second link BFR cancellation. As such, the UE 115-*k* may determine (e.g., implicitly) a successful BFR procedure via the first link based on receiving the RACH success message at 740 and may cancel the BFR procedure for the second link accordingly.

At 765, the UE 115-*k* may switch to the second beam indicated in the downlink beam switching command based on receiving the RACH success message indicating the second beam from the network entity 105-*f*.

At 770, the network entity 105-*f* may switch to the second beam indicated RACH success message. In some examples, the network entity 105-*f* may wait a duration of time after transmitting the indicated RACH success message before switching to the second beam. In some instances, the duration of time may be dependent on the delay of propagation and the processing capabilities of the UE 115-*k*.

Figure 8:
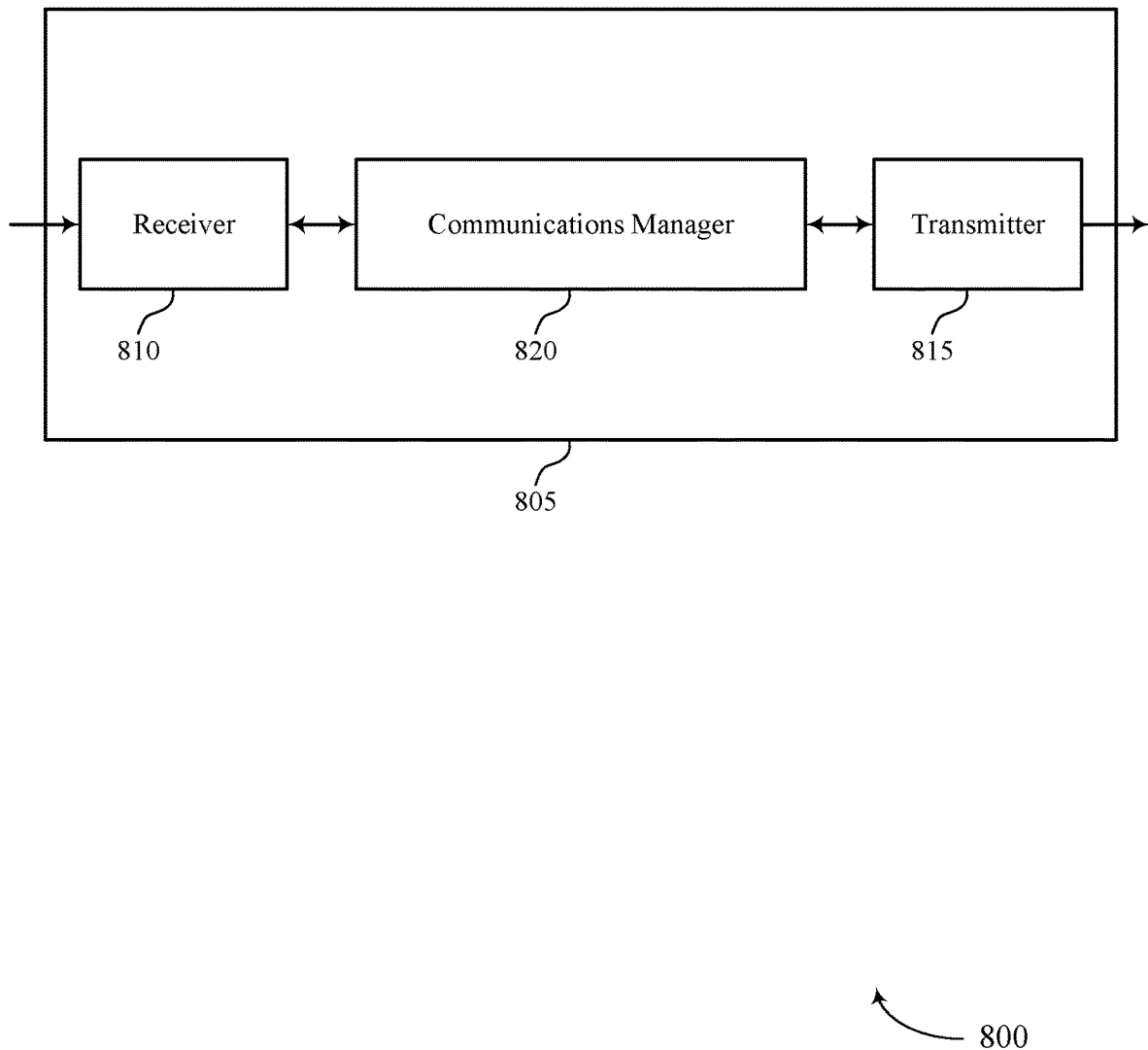
FIGS. 8 and 9 show block diagrams of devices that support utilization of secondary link for beam failure warning and recovery in accordance with one or more aspects of the present disclosure.

FIG. 8 shows a block diagram 800 of a device 805 that supports utilization of secondary link for beam failure warning and recovery in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to utilization of secondary link for beam failure warning and recovery). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to utilization of secondary link for beam failure warning and recovery). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of utilization of secondary link for beam failure warning and recovery as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The communications manager 820 may be configured as or otherwise support a means for monitoring, as part of a multi-path beam failure recovery procedure, the first link for one or more signals associated with beam failure detection based on the control signal. The communications manager 820 may be configured as or otherwise support a means for transmitting, via the first link or the second link, one or more messages in accordance with the beam failure reporting procedure, the one or more messages including information associated with the one or more parameters based on monitoring.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for decreases of BFR procedures that utilize RACH which may reduce processing, reduce power consumption, result in more efficient utilization of communication resources, and reduce latency.

Figure 9:
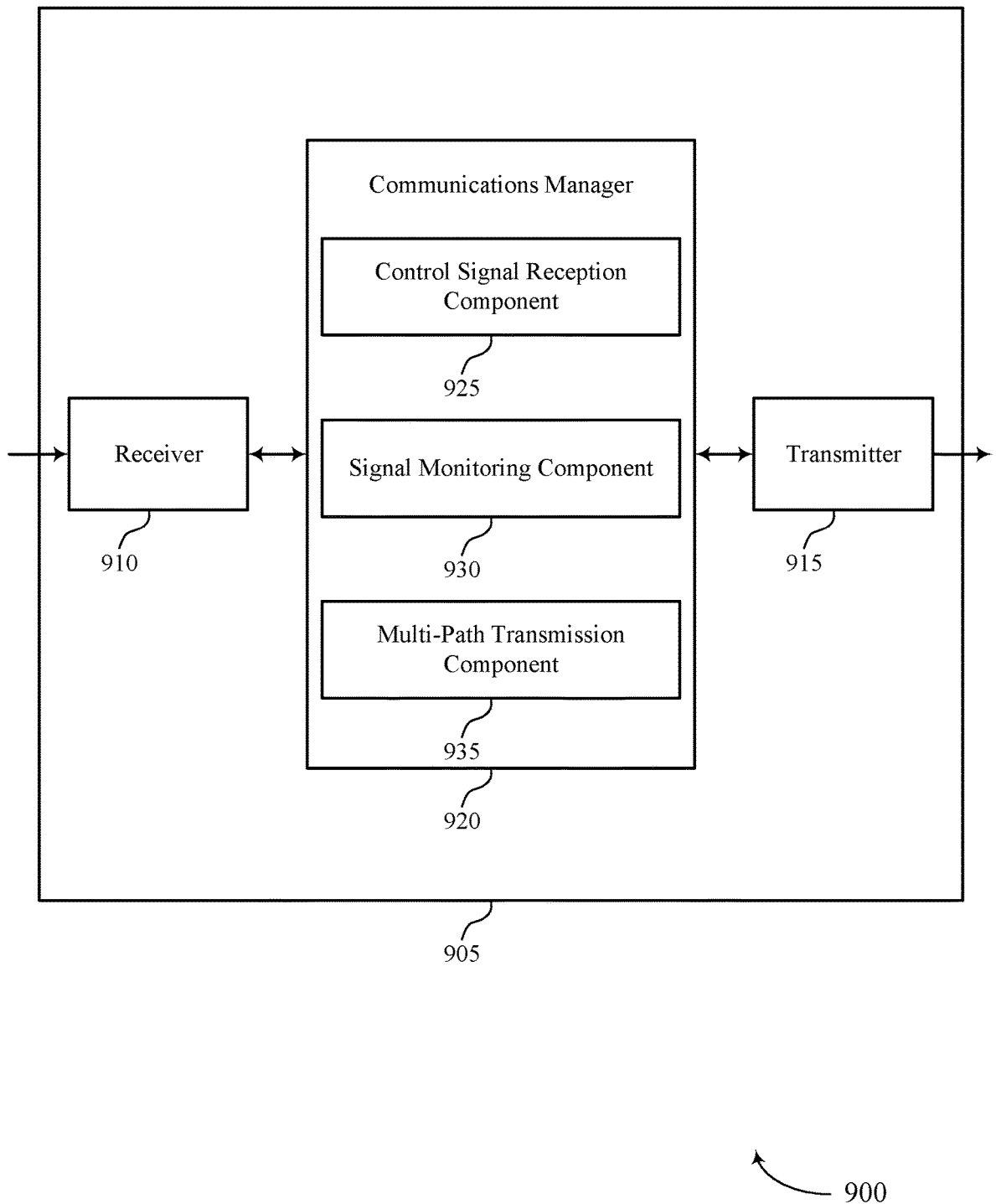

FIG. 9 shows a block diagram 900 of a device 905 that supports utilization of secondary link for beam failure warning and recovery in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to utilization of secondary link for beam failure warning and recovery). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to utilization of secondary link for beam failure warning and recovery). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of utilization of secondary link for beam failure warning and recovery as described herein. For example, the communications manager 920 may include a control signal reception component 925, a signal monitoring component 930, a multi-path transmission component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The control signal reception component 925 may be configured as or otherwise support a means for receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The signal monitoring component 930 may be configured as or otherwise support a means for monitoring, as part of a multi-path beam failure recovery procedure, the first link for one or more signals associated with beam failure detection based on the control signal. The multi-path transmission component 935 may be configured as or otherwise support a means for transmitting, via the first link or the second link, one or more messages in accordance with the beam failure reporting procedure, the one or more messages including information associated with the one or more parameters based on monitoring.

Figure 10:
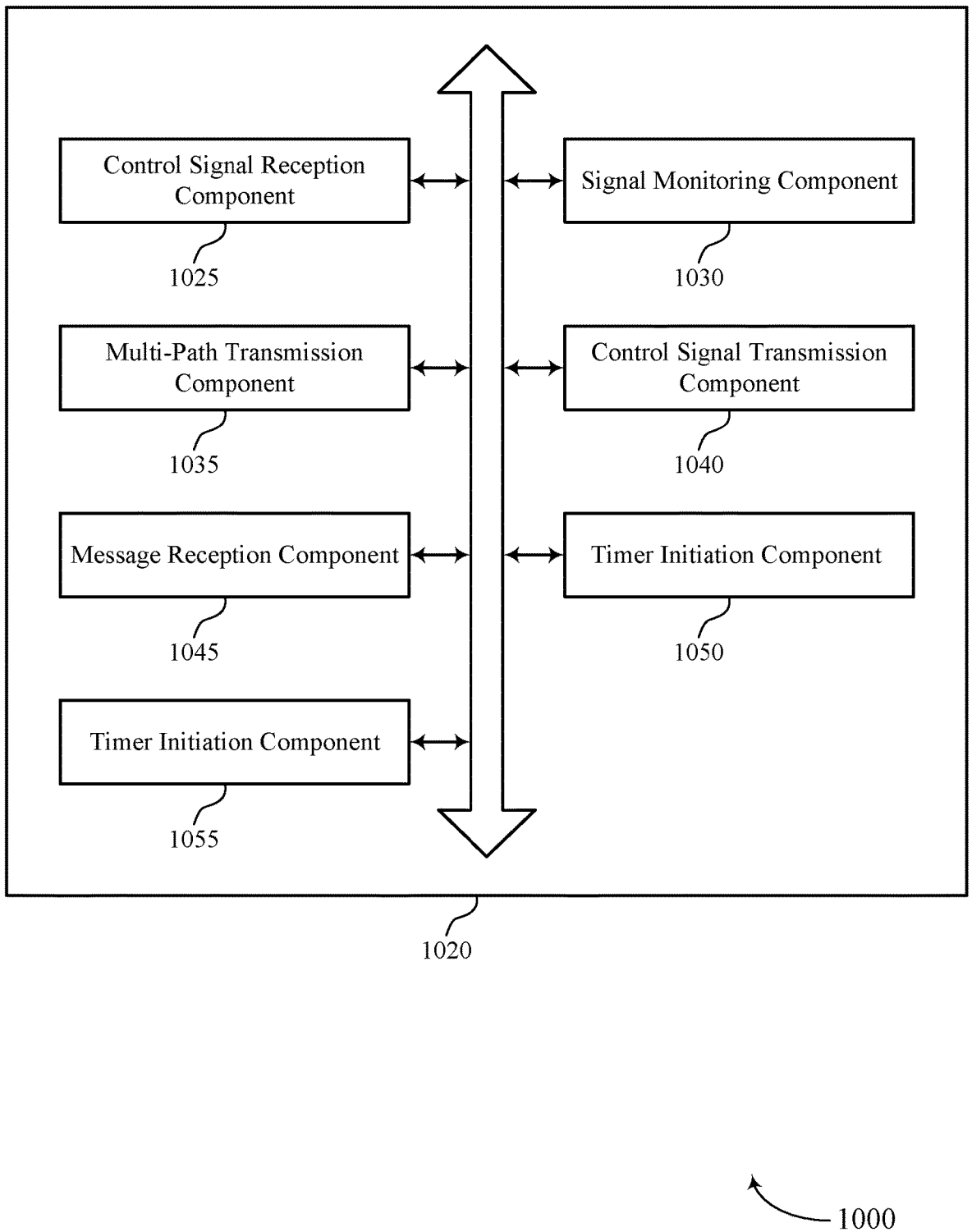
FIG. 10 shows a block diagram of a communications manager that supports utilization of secondary link for beam failure warning and recovery in accordance with one or more aspects of the present disclosure.

FIG. 10 shows a block diagram 1000 of a communications manager 1020 that supports utilization of secondary link for beam failure warning and recovery in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of utilization of secondary link for beam failure warning and recovery as described herein. For example, the communications manager 1020 may include a control signal reception component 1025, a signal monitoring component 1030, a multi-path transmission component 1035, a control signal transmission component 1040, a message reception component 1045, a timer initiation component 1050, a timer initiation component 1055, or any combination thereof. Each of these components may communicate, directly or indirectly, with one another (e.g., via one or more buses).

The control signal reception component 1025 may be configured as or otherwise support a means for receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The signal monitoring component 1030 may be configured as or otherwise support a means for monitoring, as part of a multi-path beam failure recovery procedure, the first link for one or more signals associated with beam failure detection based on the control signal. The multi-path transmission component 1035 may be configured as or otherwise support a means for transmitting, via the first link or the second link, one or more messages in accordance with the beam failure reporting procedure, the one or more messages including information associated with the one or more parameters based on monitoring.

In some examples, to support transmitting the one or more messages, the multi-path transmission component 1035 may be configured as or otherwise support a means for transmitting a first message of the one or messages via the first link, the first message including at least a first portion of the information associated with the one or more parameters, where the first message is of a first message type including one of a L1 type or a L2 type.

In some examples, to support transmitting the one or more messages, the multi-path transmission component 1035 may be configured as or otherwise support a means for transmitting a second message of the one or messages via the second link, the second message including at least a second portion of the information associated with the one or more parameters, where the second message is of a second message type including one of the L1 type or the L2 type.

In some examples, the multi-path transmission component 1035 may be configured as or otherwise support a means for concurrently transmitting the first message and the second message based on the beam failure reporting procedure being an unconditional beam failure reporting procedure.

In some examples, to support concurrently transmitting the first message and the second message, the multi-path transmission component 1035 may be configured as or otherwise support a means for transmitting the first message that includes a first MAC-CE indicating the first portion of the information. In some examples, to support concurrently transmitting the first message and the second message, the multi-path transmission component 1035 may be configured as or otherwise support a means for transmitting the second message that includes a second MAC-CE indicating the second portion of the information, where the first portion of the information and the second portion of the information are a same information or different information based on the one or more parameters indicated in the control signal.

In some examples, to support concurrently transmitting the first message and the second message, the multi-path transmission component 1035 may be configured as or otherwise support a means for transmitting the first message that includes a MAC-CE indicating the first portion of the information. In some examples, to support concurrently transmitting the first message and the second message, the multi-path transmission component 1035 may be configured as or otherwise support a means for transmitting the second message that includes UCI indicating the second portion of the information, where the first portion of the information includes a first contents greater than the second portion of the information including a second contents based on the one or more parameters indicated in the control signal.

In some examples, to support concurrently transmitting the first message and the second message, the multi-path transmission component 1035 may be configured as or otherwise support a means for transmitting the first message that includes UCI indicating the first portion of the information. In some examples, to support concurrently transmitting the first message and the second message, the multi-path transmission component 1035 may be configured as or otherwise support a means for transmitting the second message that includes a MAC-CE indicating the second portion of the information.

In some examples, to support concurrently transmitting the first message and the second message, the multi-path transmission component 1035 may be configured as or otherwise support a means for transmitting the first message that includes a first UCI indicating the first portion of the information. In some examples, to support concurrently transmitting the first message and the second message, the multi-path transmission component 1035 may be configured as or otherwise support a means for transmitting the second message that includes a second UCI indicating the second portion of the information, where the first portion of the information and the second portion of the information includes a same contents or a different contents based on the one or more parameters indicated in the control signal.

In some examples, to support transmitting the one or more messages, the multi-path transmission component 1035 may be configured as or otherwise support a means for transmitting the first message via the first link. In some examples, to support transmitting the one or more messages, the timer initiation component 1050 may be configured as or otherwise support a means for initiating a timer after transmitting the first message based on the beam failure reporting procedure being a conditional beam failure reporting procedure. In some examples, to support transmitting the one or more messages, the multi-path transmission component 1035 may be configured as or otherwise support a means for transmitting, via the second link, the second message upon expiration of the timer.

In some examples, the control signal reception component 1025 may be configured as or otherwise support a means for receiving an indication of a timer duration for the timer via a MAC-CE, via DCI, or via a RRC signal.

In some examples, to support transmitting the one or more messages, the multi-path transmission component 1035 may be configured as or otherwise support a means for transmitting the second message via the second link. In some examples, to support transmitting the one or more messages, the timer initiation component 1055 may be configured as or otherwise support a means for initiating a timer after transmitting the second message based on the beam failure reporting procedure being a conditional beam failure reporting procedure. In some examples, to support transmitting the one or more messages, the multi-path transmission component 1035 may be configured as or otherwise support a means for transmitting, via the first link, the first message upon expiration of the timer.

In some examples, the control signal reception component 1025 may be configured as or otherwise support a means for receiving an indication of a timer duration for the timer via a MAC-CE, via DCI, or via a RRC signal.

In some examples, the first portion of the information associated with the one or more parameters is based on the first message type, and the second portion of the information associated with the one or more parameters is based on the second message type.

In some examples, to support transmitting the one or more messages, the multi-path transmission component 1035 may be configured as or otherwise support a means for transmitting, via the first link, a random access message as part of a random access procedure based on a beam failure of a first beam of the first link, where the beam failure is detected based on the one or more parameters indicated by the control signal. In some examples, to support transmitting the one or more messages, the multi-path transmission component 1035 may be configured as or otherwise support a means for transmitting, via the second link, a MAC signal as part of a beam failure recovery procedure for the first beam of the first link, where the random access message and the MAC signal are transmitted concurrently.

In some examples, the message reception component 1045 may be configured as or otherwise support a means for receiving a cancellation message that cancels the random access procedure after transmitting the random access message. In some examples, the message reception component 1045 may be configured as or otherwise support a means for receiving an indication of a second beam for use by the first UE for the first link based on cancellation of the random access procedure.

In some examples, the control signal reception component 1025 may be configured as or otherwise support a means for receiving a signal indicating success of the random access procedure after transmitting the MAC signal.

In some examples, the message reception component 1045 may be configured as or otherwise support a means for receiving a cancellation message that cancels the beam failure recovery procedure based on the success of the random access procedure.

In some examples, the random access procedure or the beam failure recovery procedure is performed based on a quality of service for serving traffic being above a configured threshold or link qualities associated with the first link or the second link.

In some examples, to support transmitting the one or more messages, the multi-path transmission component 1035 may be configured as or otherwise support a means for transmitting, via the second link, a MAC signal as part of a beam failure recovery procedure for a first beam of the first link.

In some examples, to support transmitting the one or more messages, the control signal reception component 1025 may be configured as or otherwise support a means for receiving a beam switch command indicating a switch from the first beam of the first link to a second beam of the first link based on transmitting the MAC signal.

In some examples, the MAC signal is transmitted based on the second link having a greater link quality than the first link.

In some examples, the information associated with the one or more parameters includes a beam failure flag indicating a beam failure or a potential beam failure of a first beam of the first link.

In some examples, the information of the one or more messages includes information associated with a beam failure warning, the information associated with the beam failure warning includes a predicted beam blocking of the first beam, a channel strength associated with the first beam satisfying a threshold, or both.

In some examples, the information associated with the one or more parameters includes a beam failure detection status, the beam failure detection status includes a beam failure indication count, a beam failure indication history for a configured duration, or both.

In some examples, the information associated with the one or more parameters includes beam failure triggering conditions, the beam failure triggering conditions including a predicted beam failure, a consecutive number of recorded beam failure indications satisfying a first threshold, a channel strength measurement satisfying a second threshold, or a combination thereof.

In some examples, the information associated with the one or more parameters includes a requested response from the network entity, the requested response includes a beam switch indication, an adjustment for a pattern, location, or frequency of a beam failure detection reference signal, or a combination thereof.

In some examples, the information associated with the one or more parameters includes one or more beam preferences associated with the first UE.

In some examples, to support receiving the control signal, the control signal reception component 1025 may be configured as or otherwise support a means for receiving, in the control signal, an indication of the one or more parameters for the beam failure reporting procedure based on a latency associated with the one or more messages, a size of the one or more messages, an uplink resource availability, a quality of service parameter, or a combination thereof.

In some examples, the control signal reception component 1025 may be configured as or otherwise support a means for receiving, via a MAC-CE or via DCI, a signal that activates or deactivates the beam failure reporting procedure for the first UE.

In some examples, the control signal transmission component 1040 may be configured as or otherwise support a means for transmitting, via a MAC-CE or via UCI, a signal that activates or deactivates the beam failure reporting procedure for the first UE.

Figure 11:
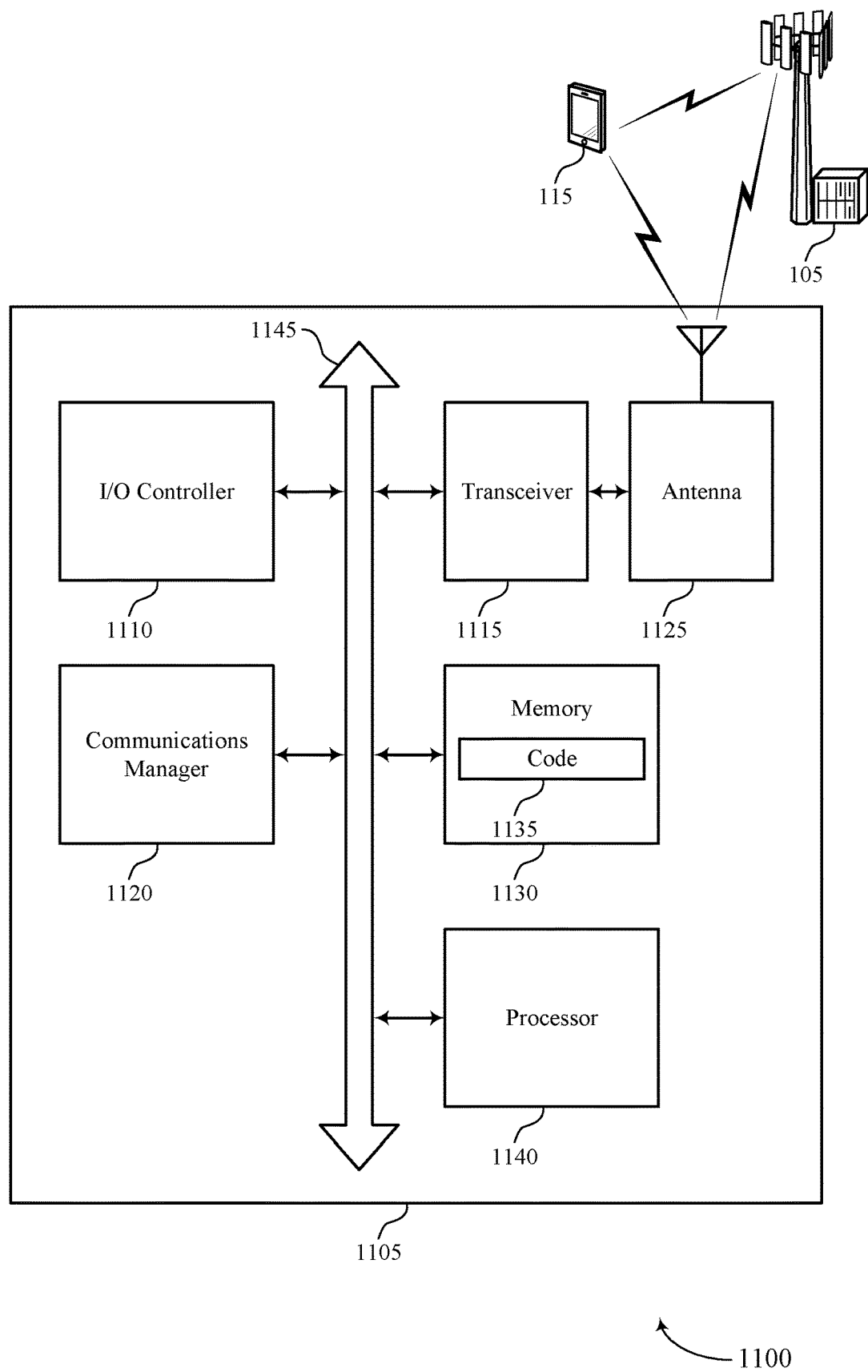
FIG. 11 shows a diagram of a system including a device that supports utilization of secondary link for beam failure warning and recovery in accordance with one or more aspects of the present disclosure.

FIG. 11 shows a diagram of a system 1100 including a device 1105 that supports utilization of secondary link for beam failure warning and recovery in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting utilization of secondary link for beam failure warning and recovery). For example, the device 1105 or a component of the device 1105 may include a processor 1140 and memory 1130 coupled with or to the processor 1140, the processor 1140 and memory 1130 configured to perform various functions described herein.

For example, the communications manager 1120 may be configured as or otherwise support a means for receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The communications manager 1120 may be configured as or otherwise support a means for monitoring, as part of a multi-path beam failure recovery procedure, the first link for one or more signals associated with beam failure detection based on the control signal. The communications manager 1120 may be configured as or otherwise support a means for transmitting, via the first link or the second link, one or more messages in accordance with the beam failure reporting procedure, the one or more messages including information associated with the one or more parameters based on monitoring.

By including or configuring the communications manager 1120 in accordance with examples as described herein, the device 1105 may support techniques for decreases of BFR procedures that utilize RACH which may reduce processing, improve communication reliability, reduce power consumption, result in more efficient utilization of communication resources, improve user experience related to reduced processing, improved coordination between devices, result in a longer battery life, and reduce latency.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of utilization of secondary link for beam failure warning and recovery as described herein, or the processor 1140 and the memory 1130 may be otherwise configured to perform or support such operations.

Figure 12:
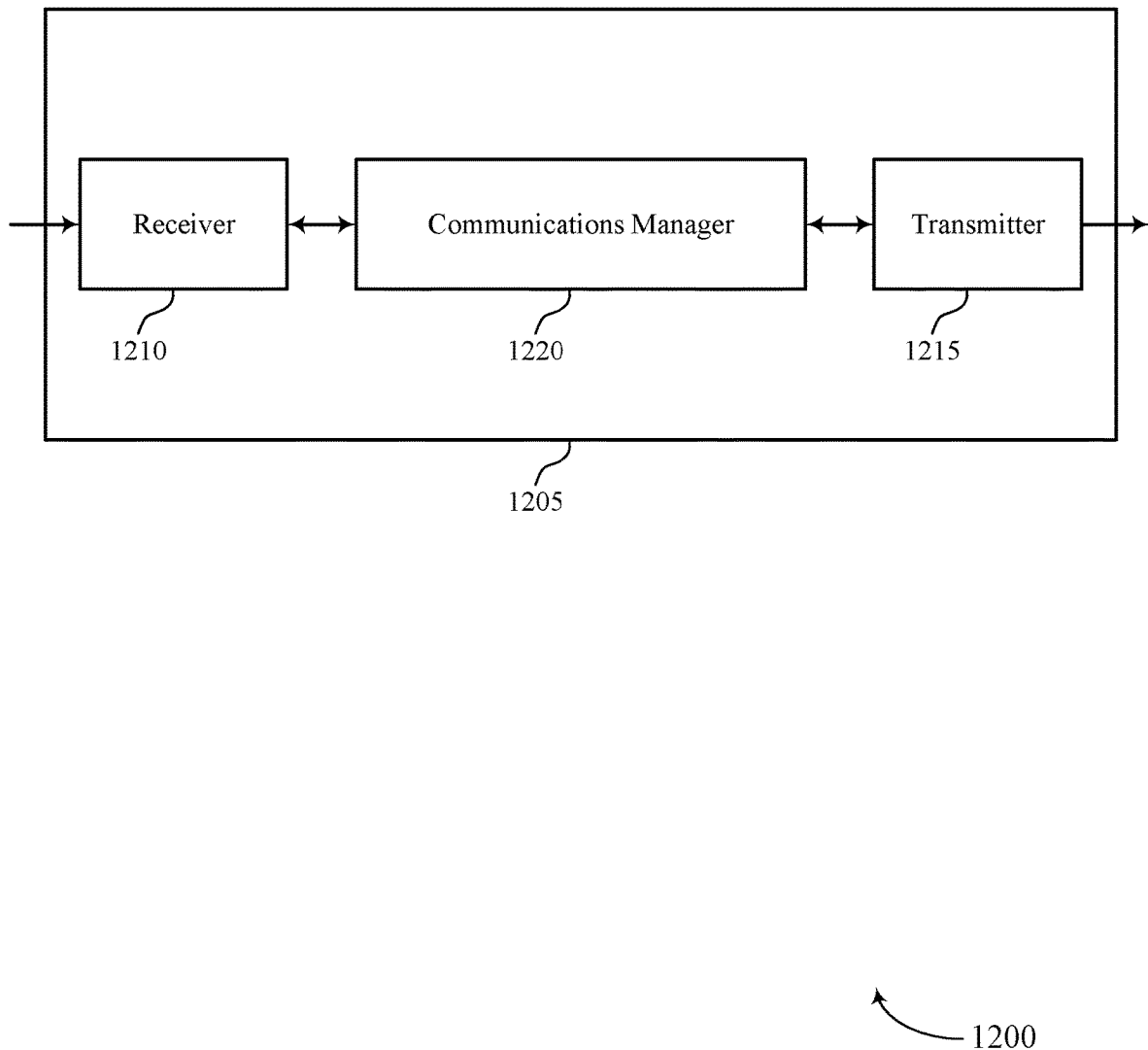
FIGS. 12 and 13 show block diagrams of devices that support utilization of secondary link for beam failure warning and recovery in accordance with one or more aspects of the present disclosure.

FIG. 12 shows a block diagram 1200 of a device 1205 that supports utilization of secondary link for beam failure warning and recovery in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of utilization of secondary link for beam failure warning and recovery as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting)

using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

For example, the communications manager 1220 may be configured as or otherwise support a means for transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The communications manager 1220 may be configured as or otherwise support a means for receiving, via the first link or the second link, one or more messages in accordance with the beam failure reporting procedure, the one or more messages including information associated with the one or more parameters based on monitoring.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for decreases of BFR procedures that utilize RACH which may reduce processing, reduce power consumption, result in more efficient utilization of communication resources, and reduce latency.

Figure 13:
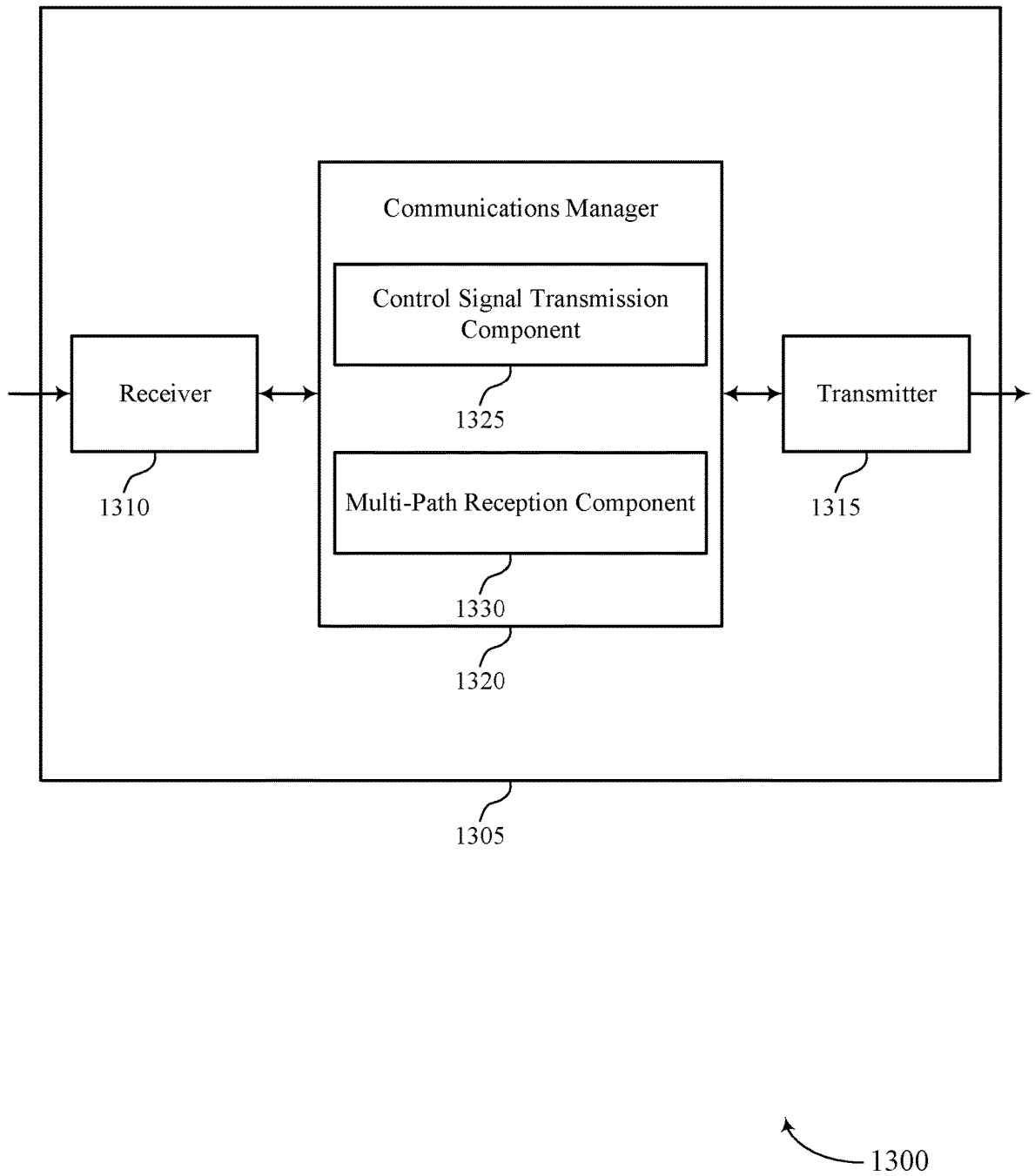

FIG. 13 shows a block diagram 1300 of a device 1305 that supports utilization of secondary link for beam failure warning and recovery in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of utilization of secondary link for beam failure warning and recovery as described herein. For example, the communications manager 1320 may include a control signal transmission component 1325 a multi-path reception component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The control signal transmission component 1325 may be configured as or otherwise support a means for transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The multi-path reception component 1330 may be configured as or otherwise support a means for receiving, via the first link or the second link, one or more messages in accordance with the beam failure reporting procedure, the one or more messages including information associated with the one or more parameters based on monitoring.

Figure 14:
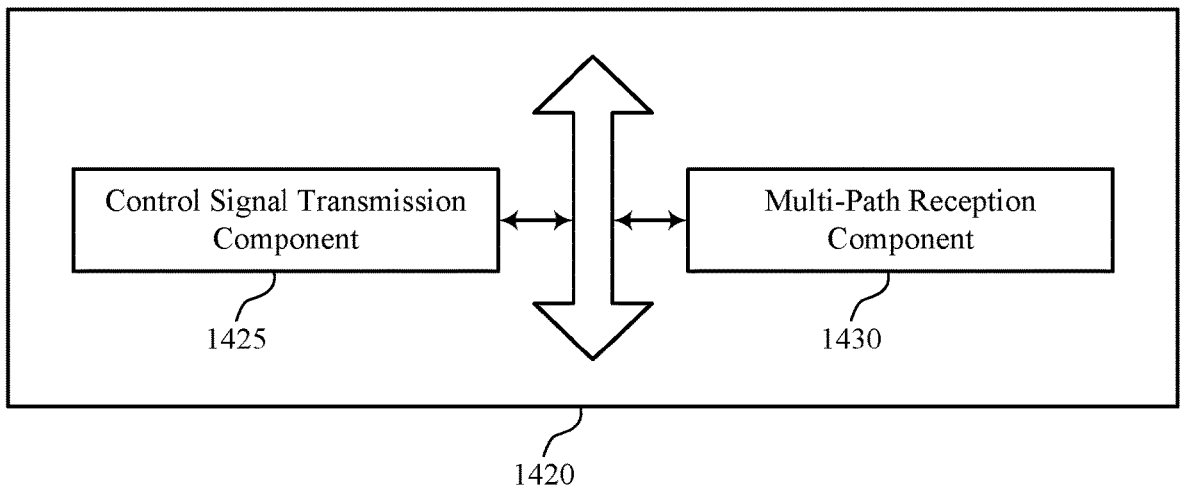
FIG. 14 shows a block diagram of a communications manager that supports utilization of secondary link for beam failure warning and recovery in accordance with one or more aspects of the present disclosure.

FIG. 14 shows a block diagram 1400 of a communications manager 1420 that supports utilization of secondary link for beam failure warning and recovery in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of utilization of secondary link for beam failure warning and recovery as described herein. For example, the communications manager 1420 may include a control signal transmission component 1425 a multi-path reception component 1430, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The control signal transmission component 1425 may be configured as or otherwise support a means for transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The multi-path reception component 1430 may be configured as or otherwise support a means for receiving, via the first link or the second link, one or more messages in accordance with the beam failure reporting procedure, the one or more messages including information associated with the one or more parameters based on monitoring.

In some examples, to support receiving the one or more messages, the multi-path reception component 1430 may be configured as or otherwise support a means for receiving a first message of the one or messages via the first link, the first message including at least a first portion of the information associated with the one or more parameters, where the first message is of a first message type including one of a L1 type or a L2 type.

In some examples, to support receiving the one or more messages, the multi-path reception component 1430 may be configured as or otherwise support a means for receiving a second message of the one or messages via the second link, the second message including at least a second portion of the information associated with the one or more parameters, where the second message is of a second message type including one of the L1 type or the L2 type.

In some examples, the multi-path reception component 1430 may be configured as or otherwise support a means for concurrently receiving the first message and the second message based on the beam failure reporting procedure being an unconditional beam failure reporting procedure.

Figure 15:
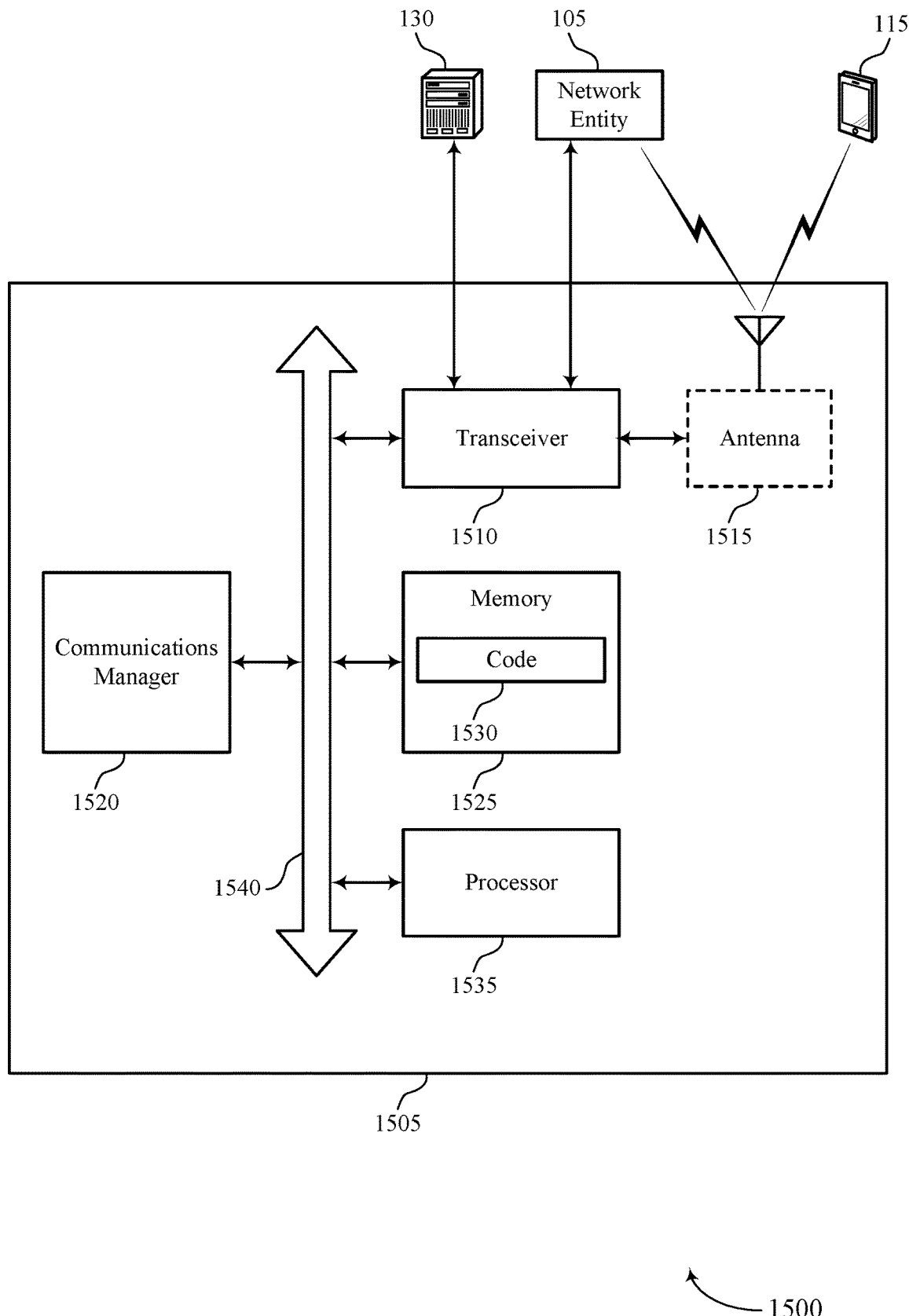
FIG. 15 shows a diagram of a system including a device that supports utilization of secondary link for beam failure warning and recovery in accordance with one or more aspects of the present disclosure.

FIG. 15 shows a diagram of a system 1500 including a device 1505 that supports utilization of secondary link for beam failure warning and recovery in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting utilization of secondary link for beam failure warning and recovery). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

For example, the communications manager 1520 may be configured as or otherwise support a means for transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The communications manager 1520 may be configured as or otherwise support a means for receiving, via the first link or the second link, one or more messages in accordance with the beam failure reporting procedure, the one or more messages including information associated with the one or more parameters based on monitoring.

By including or configuring the communications manager 1520 in accordance with examples as described herein, the device 1505 may support techniques for decreases of BFR procedures that utilize RACH which may reduce processing, improve communication reliability, reduce power consumption, result in more efficient utilization of communication resources, improve user experience related to reduced processing, improved coordination between devices, result in a longer battery life, and reduce latency.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of utilization of secondary link for beam failure warning and recovery as described herein, or the processor 1535 and the memory 1525 may be otherwise configured to perform or support such operations.

Figure 16:
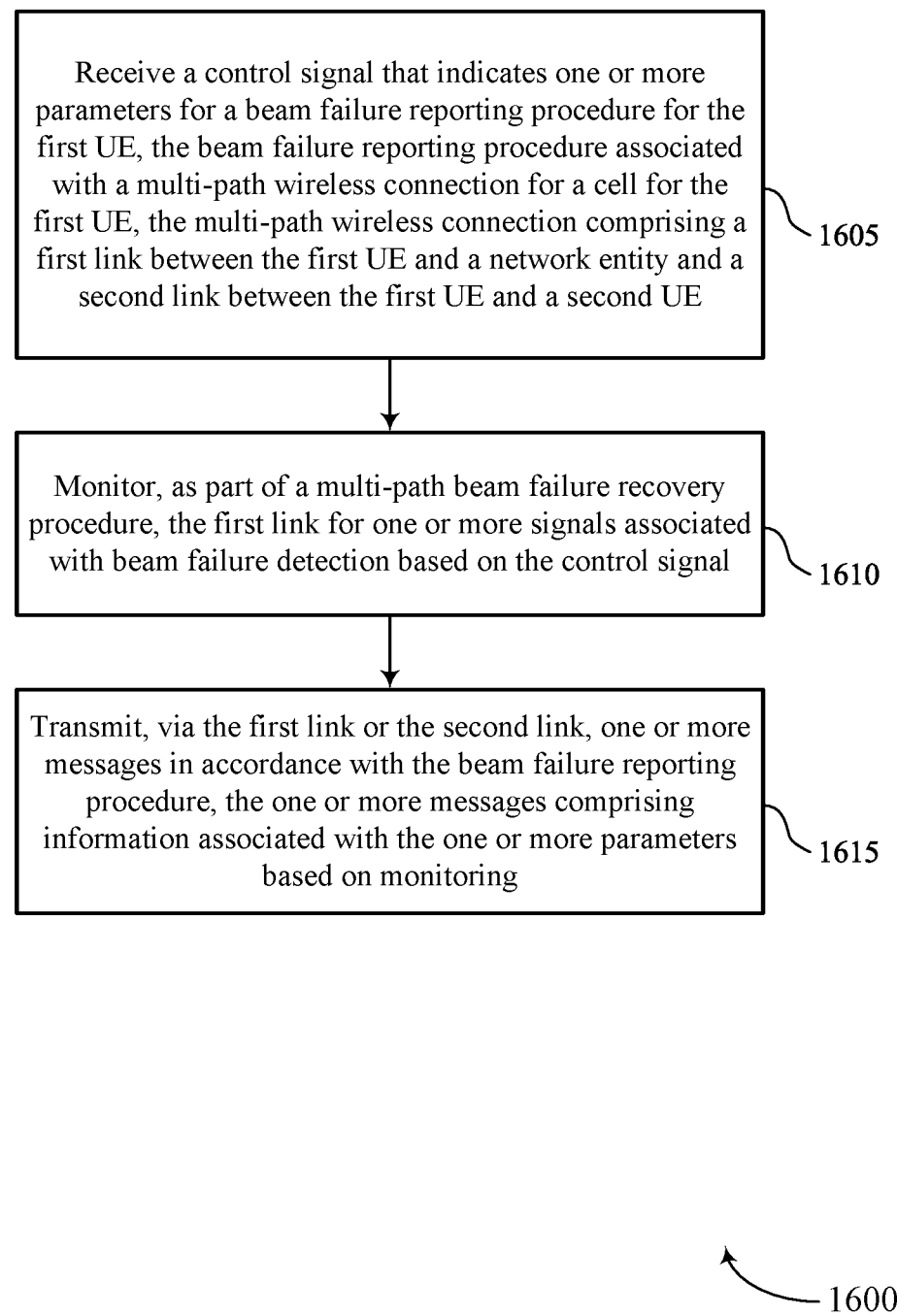
FIGS. 16 through 19 show flowcharts illustrating methods that support utilization of secondary link for beam failure warning and recovery in accordance with one or more aspects of the present disclosure.

FIG. 16 shows a flowchart illustrating a method 1600 that supports utilization of secondary link for beam failure warning and recovery in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The operations of 1605 may be performed in accordance with examples as disclosed herein. In some examples, aspects of the operations of 1605 may be performed by a control signal reception component 1025 as described with reference to FIG. 10.

At 1610, the method may include monitoring, as part of a multi-path beam failure recovery procedure, the first link for one or more signals associated with beam failure detection based on the control signal. The operations of 1610 may be performed in accordance with examples as disclosed herein. In some examples, aspects of the operations of 1610 may be performed by a signal monitoring component 1030 as described with reference to FIG. 10.

At 1615, the method may include transmitting, via the first link or the second link, one or more messages in accordance with the beam failure reporting procedure, the one or more messages including information associated with the one or more parameters based on monitoring. The operations of 1615 may be performed in accordance with examples as disclosed herein. In some examples, aspects of the operations of 1615 may be performed by a multi-path transmission component 1035 as described with reference to FIG. 10.

Figure 17:
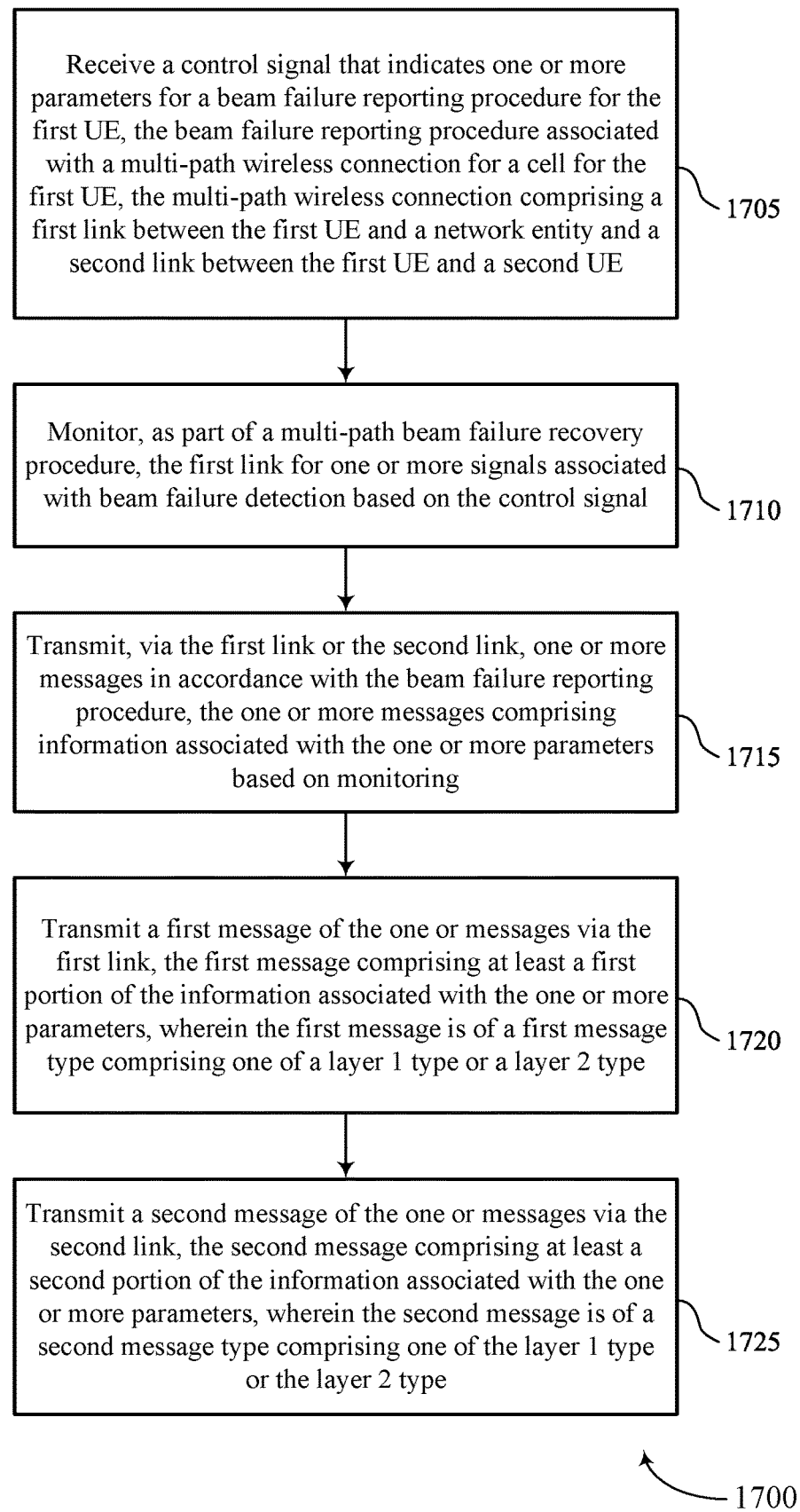

FIG. 17 shows a flowchart illustrating a method 1700 that supports utilization of secondary link for beam failure warning and recovery in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a control signal that indicates one or more parameters for a beam failure reporting procedure for the first UE, the beam failure reporting procedure associated with a multi-path wireless connection for a cell for the first UE, the multi-path wireless connection including a first link between the first UE and a network entity and a second link between the first UE and a second UE. The operations of 1705 may be performed in accordance with examples as disclosed herein. In some examples, aspects of the operations of 1705 may be performed by a control signal reception component 1025 as described with reference to FIG. 10.

At 1710, the method may include monitoring, as part of a multi-path beam failure recovery procedure, the first link for one or more signals associated with beam failure detection based on the control signal. The operations of 1710 may be performed in accordance with examples as disclosed herein. In some examples, aspects of the operations of 1710 may be performed by a signal monitoring component 1030 as described with reference to FIG. 10.

At 1715, the method may include transmitting, via the first link or the second link, one or more messages in accordance with the beam failure reporting procedure, the one or more messages including information associated with the one or more parameters based on monitoring. The operations of 1715 may be performed in accordance with examples as disclosed herein. In some examples, aspects of the operations of 1715 may be performed by a multi-path transmission component 1035 as described with reference to FIG. 10.

At 1720, the method may include transmitting a first message of the one or messages via the first link, the first message including at least a first portion of the information associated with the one or more parameters, where the first message is of a first message type including one of a L1 type or a L2 type. The operations of 1720 may be performed in accordance with examples as disclosed herein. In some examples, aspects of the operations of 1720 may be performed by a multi-path transmission component 1035 as described with reference to FIG. 10.

At 1725, the method may include transmitting a second message of the one or messages via the second link, the second message including at least a second portion of the information associated with the one or more parameters, where the second message is of a second message type including one of the L1 type or the L2 type. The operations of 1725 may be performed in accordance with examples as disclosed herein. In some examples, aspects of the operations of 1725 may be performed by a multi-path transmission component 1035 as described with reference to FIG. 10.

Figure 18:
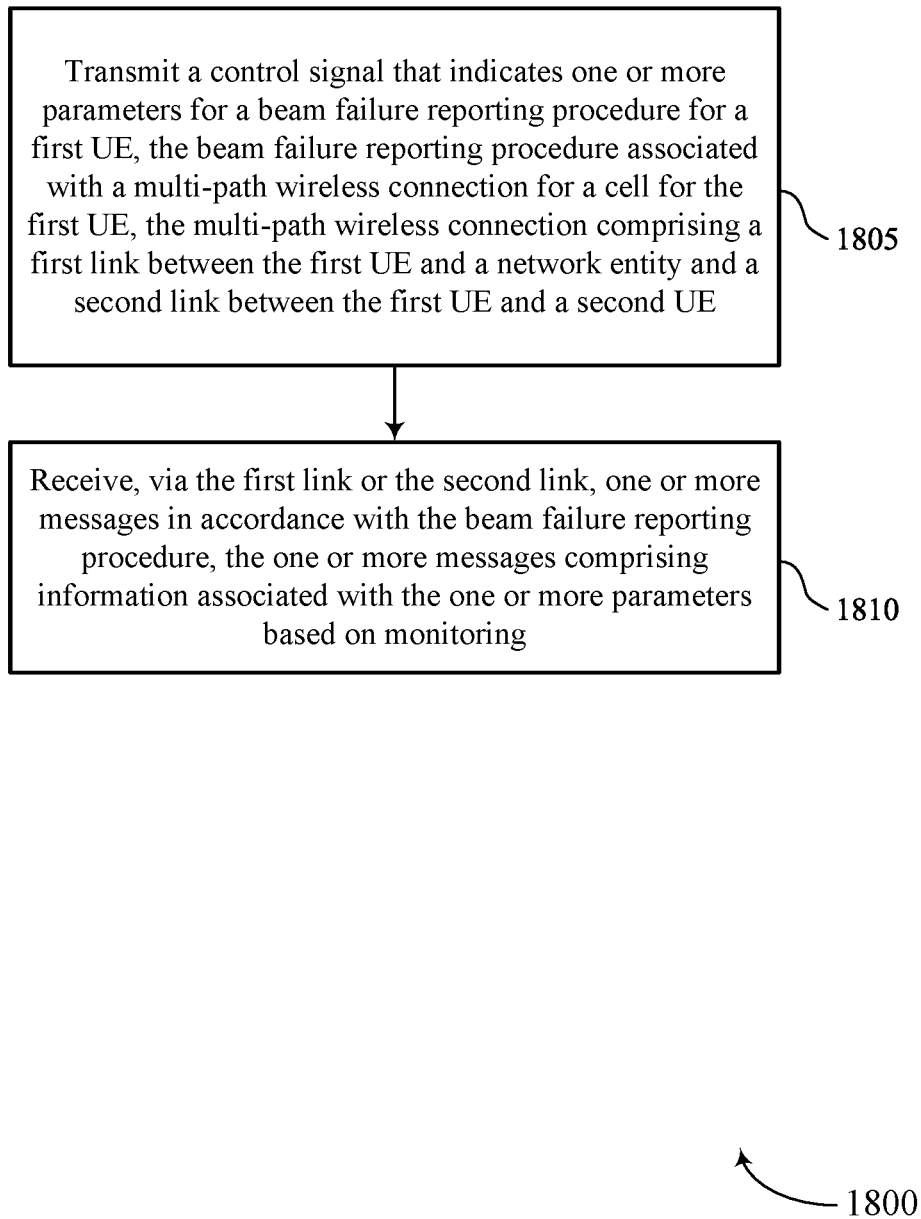

FIG. 18 shows a flowchart illustrating a method 1800 that supports utilization of secondary link for beam failure warning and recovery in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The operations of 1805 may be performed in accordance with examples as disclosed herein. In some examples, aspects of the operations of 1805 may be performed by a control signal transmission component 1425 as described with reference to FIG. 14.

At 1810, the method may include receiving, via the first link or the second link, one or more messages in accordance with the beam failure reporting procedure, the one or more messages including information associated with the one or more parameters based on monitoring. The operations of 1810 may be performed in accordance with examples as disclosed herein. In some examples, aspects of the operations of 1810 may be performed by a multi-path reception component 1430 as described with reference to FIG. 14.

Figure 19:
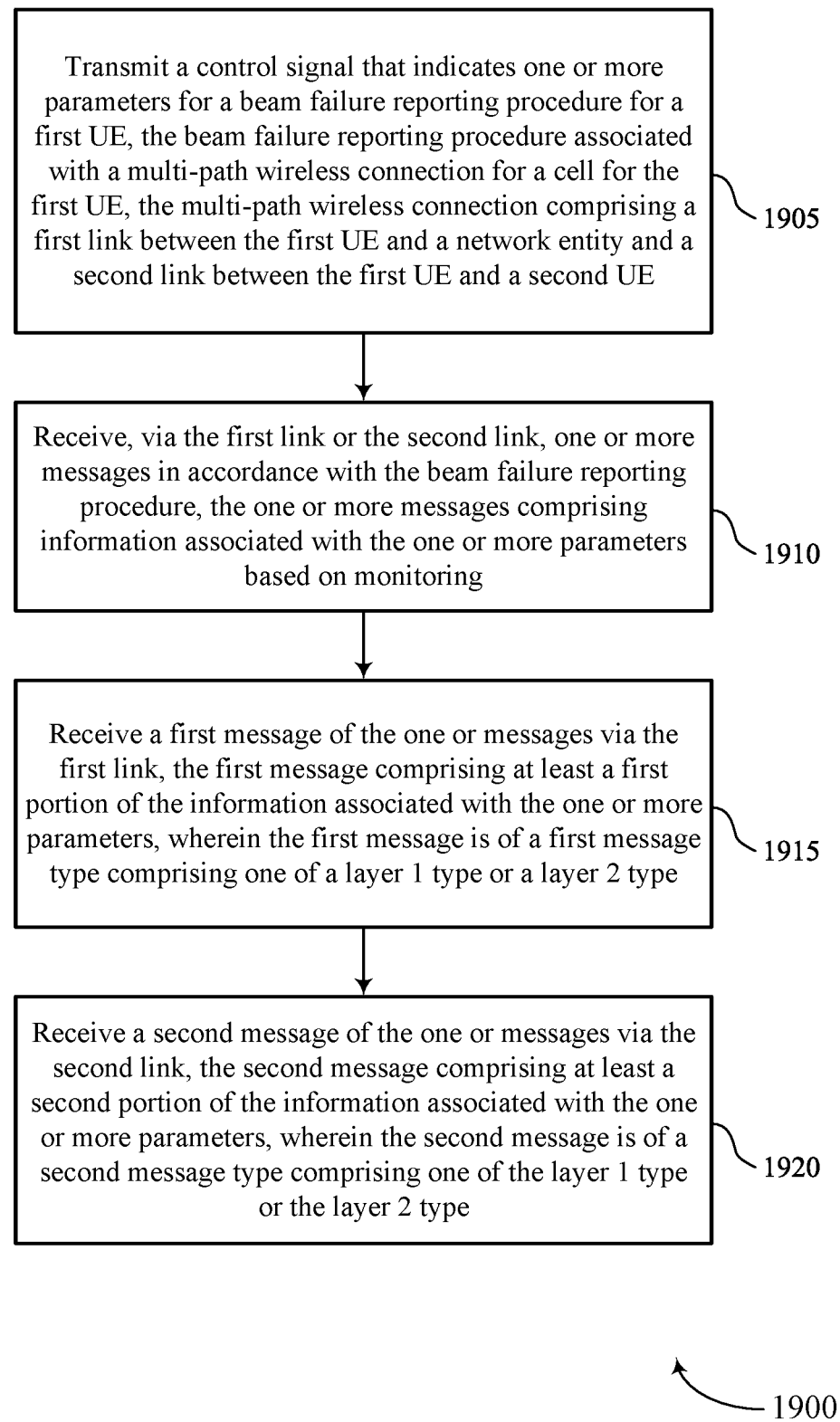

FIG. 19 shows a flowchart illustrating a method 1900 that supports utilization of secondary link for beam failure warning and recovery in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a control signal that indicates one or more parameters for a beam failure reporting procedure for a first UE, the beam failure reporting procedure associated with a multi-path wireless connection for a cell for the first UE, the multi-path wireless connection including a first link between the first UE and a network entity and a second link between the first UE and a second UE. The operations of 1905 may be performed in accordance with examples as disclosed herein. In some examples, aspects of the operations of 1905 may be performed by a control signal transmission component 1425 as described with reference to FIG. 14.

At 1910, the method may include receiving, via the first link or the second link, one or more messages in accordance with the beam failure reporting procedure, the one or more messages including information associated with the one or more parameters based on monitoring. The operations of 1910 may be performed in accordance with examples as disclosed herein. In some examples, aspects of the operations of 1910 may be performed by a multi-path reception component 1430 as described with reference to FIG. 14.

At 1915, the method may include receiving a first message of the one or messages via the first link, the first message including at least a first portion of the information associated with the one or more parameters, where the first message is of a first message type including one of a L1 type or a L2 type. The operations of 1915 may be performed in accordance with examples as disclosed herein. In some examples, aspects of the operations of 1915 may be performed by a multi-path reception component 1430 as described with reference to FIG. 14.

At 1920, the method may include receiving a second message of the one or messages via the second link, the second message including at least a second portion of the information associated with the one or more parameters, where the second message is of a second message type including one of the L1 type or the L2 type. The operations of 1920 may be performed in accordance with examples as disclosed herein. In some examples, aspects of the operations of 1920 may be performed by a multi-path reception component 1430 as described with reference to FIG. 14.

The following provides an overview of aspects of the present disclosure:

Aspect 1: A method at a first UE, comprising: receiving a control signal that indicates one or more parameters for a beam failure reporting procedure for the first UE, the beam failure reporting procedure associated with a multi-path wireless connection for a cell for the first UE, the multi-path wireless connection comprising a first link between the first UE and a network entity and a second link between the first UE and a second UE; monitoring, as part of a multi-path BFR procedure, the first link for one or more signals associated with BFD based at least in part on the control signal; and transmitting, via the first link or the second link, one or more messages in accordance with the beam failure reporting procedure, the one or more messages comprising information associated with the one or more parameters based at least in part on monitoring.

Aspect 2: The method of aspect 1, wherein transmitting the one or more messages comprises: transmitting a first message of the one or messages via the first link, the first message comprising at least a first portion of the information associated with the one or more parameters, wherein the first message is of a first message type comprising one of a L1 type or a L2 type.

Aspect 3: The method of aspect 2, wherein transmitting the one or more messages comprises: transmitting a second message of the one or messages via the second link, the second message comprising at least a second portion of the information associated with the one or more parameters, wherein the second message is of a second message type comprising one of the L1 type or the L2 type.

Aspect 4: The method of aspect 3, further comprising: concurrently transmitting the first message and the second message based at least in part on the beam failure reporting procedure being an unconditional beam failure reporting procedure.

Aspect 5: The method of aspect 4, wherein the first message type and the second message type comprise the L2 type, and wherein the concurrently transmitting the first message and the second message comprises: transmitting the first message that comprises a first MAC-CE indicating the first portion of the information; and transmitting the second message that comprises a second MAC-CE indicating the second portion of the information, wherein the first portion of the information and the second portion of the information are a same information or different information based at least in part on the one or more parameters indicated in the control signal.

Aspect 6: The method of any of aspects 4 through 5, wherein the first message type comprises the L2 type and the second message type comprises the L1 type, and wherein the concurrently transmitting the first message and the second message comprises: transmitting the first message that comprises a MAC-CE indicating the first portion of the information; and transmitting the second message that comprises UCI indicating the second portion of the information, wherein the first portion of the information comprises a first contents greater than the second portion of the information comprising a second contents based at least in part on the one or more parameters indicated in the control signal.

Aspect 7: The method of any of aspects 4 through 6, wherein the first message type comprises the L1 type and the second message type comprises the L2 type, and wherein the concurrently transmitting the first message and the second message comprises: transmitting the first message that comprises UCI indicating the first portion of the information; and transmitting the second message that comprises a MAC-CE indicating the second portion of the information.

Aspect 8: The method of any of aspects 4 through 7, wherein the first message type and the second message type comprise the L1 type, and wherein the concurrently transmitting the first message and the second message comprises: transmitting the first message that comprises a first UCI indicating the first portion of the information; and transmitting the second message that comprises a second UCI indicating the second portion of the information, wherein the first portion of the information and the second portion of the information comprises a same contents or a different contents based at least in part on the one or more parameters indicated in the control signal.

Aspect 9: The method of any of aspects 3 through 8, wherein transmitting the one or more messages comprises: transmitting the first message via the first link; initiating a timer after transmitting the first message based at least in part on the beam failure reporting procedure being a conditional beam failure reporting procedure; and transmitting, via the second link, the second message upon expiration of the timer.

Aspect 10: The method of aspect 9, further comprising: receiving an indication of a timer duration for the timer via a MAC-CE, via DCI, or via a RRC signal.

Aspect 11: The method of any of aspects 3 through 10, wherein transmitting the one or more messages further comprises: transmitting the second message via the second link; initiating a timer after transmitting the second message based at least in part on the beam failure reporting procedure being a conditional beam failure reporting procedure; and transmitting, via the first link, the first message upon expiration of the timer.

Aspect 12: The method of aspect 11, further comprising: receiving an indication of a timer duration for the timer via a MAC-CE, via DCI, or via a RRC signal.

Aspect 13: The method of any of aspects 3 through 12, wherein the first portion of the information associated with the one or more parameters is based at least in part on the first message type, and the second portion of the information associated with the one or more parameters is based at least in part on the second message type.

Aspect 14: The method of any of aspects 1 through 13, wherein transmitting the one or more messages further comprises: transmitting, via the first link, a random access message as part of a random access procedure based at least in part on a beam failure of a first beam of the first link, wherein the beam failure is detected based at least in part on the one or more parameters indicated by the control signal; and transmitting, via the second link, a MAC signal as part of a BFR procedure for the first beam of the first link, wherein the random access message and the MAC signal are transmitted concurrently.

Aspect 15: The method of aspect 14, further comprising: receiving a cancellation message that cancels the random access procedure after transmitting the random access message; and receiving an indication of a second beam for use by the first UE for the first link based at least in part on cancellation of the random access procedure.

Aspect 16: The method of any of aspects 14 through 15, further comprising: receiving a signal indicating success of the random access procedure after transmitting the MAC signal.

Aspect 17: The method of aspect 16, further comprising: receiving a cancellation message that cancels the BFR procedure based at least in part on the success of the random access procedure.

Aspect 18: The method of any of aspects 14 through 17, wherein the random access procedure or the BFR procedure is performed based at least in part on a quality of service for serving traffic being above a configured threshold or link qualities associated with the first link or the second link.

Aspect 19: The method of any of aspects 1 through 18, wherein transmitting the one or more messages further comprises: transmitting, via the second link, a MAC signal as part of a BFR procedure for a first beam of the first link; and receiving a beam switch command indicating a switch from the first beam of the first link to a second beam of the first link based at least in part on transmitting the MAC signal.

Aspect 20: The method of aspect 19, wherein the MAC signal is transmitted based at least in part on the second link having a greater link quality than the first link.

Aspect 21: The method of any of aspects 1 through 20, wherein the information associated with the one or more parameters comprises a beam failure flag indicating a beam failure or a potential beam failure of a first beam of the first link.

Aspect 22: The method of aspect 21, wherein the information of the one or more messages comprises information associated with a beam failure warning, the information associated with the beam failure warning comprises a predicted beam blocking of the first beam, a channel strength associated with the first beam satisfying a threshold, or both.

Aspect 23: The method of any of aspects 21 through 22, wherein the information associated with the one or more parameters comprises a BFD status, the BFD status comprises a beam failure indication count, a beam failure indication history for a configured duration, or both.

Aspect 24: The method of any of aspects 21 through 23, wherein the information associated with the one or more parameters comprises beam failure triggering conditions, the beam failure triggering conditions comprising a predicted beam failure, a consecutive number of recorded beam failure indications satisfying a first threshold, a channel strength measurement satisfying a second threshold, or a combination thereof.

Aspect 25: The method of any of aspects 21 through 24, wherein the information associated with the one or more parameters comprises a requested response from the network entity, the requested response comprises a beam switch indication, an adjustment for a pattern, location, or frequency of a BFD reference signal, or a combination thereof.

Aspect 26: The method of any of aspects 21 through 25, wherein the information associated with the one or more parameters comprises one or more beam preferences associated with the first UE.

Aspect 27: The method of any of aspects 1 through 26, wherein receiving the control signal comprises: receiving, in the control signal, an indication of the one or more parameters for the beam failure reporting procedure based at least in part on a latency associated with the one or more messages, a size of the one or more messages, an uplink resource availability, a quality of service parameter, or a combination thereof.

Aspect 28: The method of any of aspects 1 through 27, further comprising: receiving, via a MAC-CE or via DCI, a signal that activates or deactivates the beam failure reporting procedure for the first UE.

Aspect 29: The method of any of aspects 1 through 28, further comprising: transmitting, via a MAC-CE or via UCI, a signal that activates or deactivates the beam failure reporting procedure for the first UE.

Aspect 30: A method at a network entity, comprising: transmitting a control signal that indicates one or more parameters for a beam failure reporting procedure for a first UE, the beam failure reporting procedure associated with a multi-path wireless connection for a cell for the first UE, the multi-path wireless connection comprising a first link between the first UE and a network entity and a second link between the first UE and a second UE; and receiving, via the first link or the second link, one or more messages in accordance with the beam failure reporting procedure, the one or more messages comprising information associated with the one or more parameters based at least in part on monitoring.

Aspect 31: The method of aspect 30, wherein receiving the one or more messages comprises: receiving a first message of the one or messages via the first link, the first message comprising at least a first portion of the information associated with the one or more parameters, wherein the first message is of a first message type comprising one of a L1 type or a L2 type.

Aspect 32: The method of aspect 31, wherein receiving the one or more messages comprises: receiving a second message of the one or messages via the second link, the second message comprising at least a second portion of the information associated with the one or more parameters, wherein the second message is of a second message type comprising one of the L1 type or the L2 type.

Aspect 33: The method of aspect 32, further comprising: concurrently receiving the first message and the second message based at least in part on the beam failure reporting procedure being an unconditional beam failure reporting procedure.

Aspect 34: An apparatus comprising a processor; memory coupled with the processor; and instructions stored in the memory and executable by the processor to cause the apparatus to perform a method of any of aspects 1 through 29.

Aspect 35: An apparatus comprising at least one means for performing a method of any of aspects 1 through 29.

Aspect 36: A non-transitory computer-readable medium storing code the code comprising instructions executable by a processor to perform a method of any of aspects 1 through 29.

Aspect 37: An apparatus comprising a processor; memory coupled with the processor; and instructions stored in the memory and executable by the processor to cause the apparatus to perform a method of any of aspects 30 through 33.

Aspect 38: An apparatus comprising at least one means for performing a method of any of aspects 30 through 33.

Aspect 39: A non-transitory computer-readable medium storing code the code comprising instructions executable by a processor to perform a method of any of aspects 30 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memories; and
one or more processors coupled to the one or more memories and configured to:
receive a control signal that indicates one or more parameters for a beam failure reporting procedure for a first user equipment (UE), the beam failure reporting procedure associated with a multi-path wireless connection for a cell for the first UE, the multi-path wireless connection comprising a first link between the first UE and a network entity and a second link between the first UE and a second UE;
monitor, as part of a multi-path beam failure recovery procedure, the first link for one or more signals associated with beam failure detection based at least in part on the control signal;
transmit, via the first link, a first message associated with the beam failure detection that comprises a first portion of information associated with the one or more parameters; and
transmit, via the second link concurrently with the first message, a second message associated with the beam failure detection that comprises a second portion of the information as part of the beam failure reporting procedure.

2. The apparatus of claim 1, wherein
the first message is of a first message type comprising one of a layer 1 type or a layer 2 type.

3. The apparatus of claim 2, wherein
the second message is of a second message type comprising one of the layer 1 type or the layer 2 type.

4. The apparatus of claim 3, wherein the one or more processors coupled to the one or more memories is further configured to cause the apparatus to:
concurrently transmit the first message and the second message based at least in part on the beam failure reporting procedure being an unconditional beam failure reporting procedure.

5. The apparatus of claim 4, wherein the one or more processors coupled to the one or more memories and configured to concurrently transmit the first message and the second message is further configured to cause the apparatus to:
transmit the first message that comprises a first medium access control-control element indicating the first portion of the information; and
transmit the second message that comprises a second medium access control-control element indicating the second portion of the information, wherein the first portion of the information and the second portion of the information are a same information or different information based at least in part on the one or more parameters indicated in the control signal.

6. The apparatus of claim 4, wherein the one or more processors coupled to the one or more memories and configured to concurrently transmit the first message and the second message is further configured to cause the apparatus to:
transmit the first message that comprises a medium access control-control element indicating the first portion of the information; and
transmit the second message that comprises uplink control information indicating the second portion of the information, wherein the first portion of the information comprises a first contents greater than the second portion of the information comprising a second contents based at least in part on the one or more parameters indicated in the control signal.

7. The apparatus of claim 4, wherein the one or more processors coupled to the one or more memories and configured to concurrently transmit the first message and the second message is further configured to cause the apparatus to:
transmit the first message that comprises uplink control information indicating the first portion of the information; and
transmit the second message that comprises a medium access control-control element indicating the second portion of the information.

8. The apparatus of claim 4, wherein the one or more processors coupled to the one or more memories and configured to concurrently transmit the first message and the second message is further configured to cause the apparatus to:
transmit the first message that comprises a first uplink control information indicating the first portion of the information; and
transmit the second message that comprises a second uplink control information indicating the second portion of the information, wherein the first portion of the information and the second portion of the information comprises a same contents or a different contents based at least in part on the one or more parameters indicated in the control signal.

9. The apparatus of claim 1, wherein the one or more processors coupled to the one or more memories and configured to transmit the first message and the second message is further configured to cause the apparatus to:
transmit, via the first link, a random access message as part of a random access procedure based at least in part on a beam failure of a first beam of the first link, wherein the beam failure is detected based at least in part on the one or more parameters indicated by the control signal; and
transmit, via the second link, a medium access control signal as part of a beam failure recovery procedure for the first beam of the first link, wherein the random access message and the medium access control signal are transmitted concurrently.

10. The apparatus of claim 9, wherein the one or more processors coupled to the one or more memories is further configured to cause the apparatus to:
receive a cancellation message that cancels the random access procedure after transmitting the random access message; and
receive an indication of a second beam for use by the first UE for the first link based at least in part on cancellation of the random access procedure.

11. The apparatus of claim 9, wherein the one or more processors coupled to the one or more memories is further configured to cause the apparatus to:
receive a signal indicating success of the random access procedure after transmitting the medium access control signal.

12. The apparatus of claim 11, wherein the one or more processors coupled to the one or more memories is further configured to cause the apparatus to:
receive a cancellation message that cancels the beam failure recovery procedure based at least in part on the success of the random access procedure.

13. The apparatus of claim 1, wherein the one or more processors coupled to the one or more memories and configured to transmit the first message and the second message is further configured to cause the apparatus to:
transmit, via the second link, a medium access control signal as part of a beam failure recovery procedure for a first beam of the first link; and
receive a beam switch command indicating a switch from the first beam of the first link to a second beam of the first link based at least in part on transmitting the medium access control signal.

14. The apparatus of claim 1, wherein the information associated with the one or more parameters comprises a beam failure flag indicating a beam failure or a potential beam failure of a first beam of the first link.

15. The apparatus of claim 14, wherein the information of the first message and the second message comprises information associated with a beam failure warning, the information associated with the beam failure warning comprises a predicted beam blocking of the first beam, a channel strength associated with the first beam satisfying a threshold, or both.

16. The apparatus of claim 14, wherein the information associated with the one or more parameters comprises a beam failure detection status, the beam failure detection status comprises a beam failure indication count, a beam failure indication history for a configured duration, or both.

17. The apparatus of claim 14, wherein the information associated with the one or more parameters comprises beam failure triggering conditions, the beam failure triggering conditions comprising a predicted beam failure, a consecutive number of recorded beam failure indications satisfying a first threshold, a channel strength measurement satisfying a second threshold, or a combination thereof.

18. The apparatus of claim 14, wherein the information associated with the one or more parameters comprises a requested response from the network entity, the requested response comprises a beam switch indication, an adjustment for a pattern, location, or frequency of a beam failure detection reference signal, or a combination thereof.

19. The apparatus of claim 1, wherein the one or more processors coupled to the one or more memories is further configured to cause the apparatus to:
receive, via a medium access control-control element or via downlink control information, a signal that activates or deactivates the beam failure reporting procedure for the first UE.

20. The apparatus of claim 1, wherein the one or more processors coupled to the one or more memories is further configured to cause the apparatus to:
transmit, via a medium access control-control element or via uplink control information, a signal that activates or deactivates the beam failure reporting procedure for the first UE.

21. An apparatus, comprising:
one or more memories; and
one or more processors coupled to the one or more memories and configured to:
transmit a control signal that indicates one or more parameters for a beam failure reporting procedure for a first user equipment (UE), the beam failure reporting procedure associated with a multi-path wireless connection for a cell for the first UE, the multi-path wireless connection comprising a first link between the first UE and a network entity and a second link between the first UE and a second UE;
receive a first message associated with a beam failure detection that comprises a first portion of information associated with the one or more parameters; and
receive, concurrently with the first message, a second message associated with the beam failure detection that comprises a second portion of the information as part of the beam failure reporting procedure.

22. The apparatus of claim 21, wherein
the first message is of a first message type comprising one of a layer 1 type or a layer 2 type.

23. The apparatus of claim 22, wherein
the second message is of a second message type comprising one of the layer 1 type or the layer 2 type.

24. The apparatus of claim 23, wherein the one or more processors coupled to the one or more memories is further configured to cause the apparatus to:
concurrently receive the first message and the second message based at least in part on the beam failure reporting procedure being an unconditional beam failure reporting procedure.

25. A method at a first user equipment (UE), comprising:
receiving a control signal that indicates one or more parameters for a beam failure reporting procedure for the first UE, the beam failure reporting procedure associated with a multi-path wireless connection for a cell for the first UE, the multi-path wireless connection comprising a first link between the first UE and a network entity and a second link between the first UE and a second UE;
monitoring, as part of a multi-path beam failure recovery procedure, the first link for one or more signals associated with beam failure detection based at least in part on the control signal;
transmitting, via the first link, a first message associated with the beam failure detection that comprises a first portion of information associated with the one or more parameters; and
transmitting, via the second link concurrently with the first message, a second message associated with the beam failure detection that comprises a second portion of the information as part of the beam failure reporting procedure.

26. A method at a network entity, comprising:
transmitting a control signal that indicates one or more parameters for a beam failure reporting procedure for a first user equipment (UE), the beam failure reporting procedure associated with a multi-path wireless connection for a cell for the first UE, the multi-path wireless connection comprising a first link between the first UE and the network entity and a second link between the first UE and a second UE;
receiving a first message associated with a beam failure detection that comprises a first portion of information associated with the one or more parameters; and
receiving, concurrently with the first message, a second message associated with the beam failure detection that comprises a second portion of the information as part of the beam failure reporting procedure.

* * * * *